United States Patent
Park et al.

(10) Patent No.: US 12,329,015 B2
(45) Date of Patent: Jun. 10, 2025

(54) SENSOR EMBEDDED DISPLAY PANEL AND ELECTRONIC DEVICE

(71) Applicant: Samsung Electronics Co., Ltd., Suwon-si (KR)

(72) Inventors: Kyung Bae Park, Hwaseong-si (KR); Sung Young Yun, Suwon-si (KR); Chul Joon Heo, Busan (KR); Hyeong-Ju Kim, Changwon-si (KR); Feifei Fang, Suwon-si (KR); Taejin Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 376 days.

(21) Appl. No.: 17/744,084

(22) Filed: May 13, 2022

(65) Prior Publication Data

US 2022/0406855 A1 Dec. 22, 2022

(30) Foreign Application Priority Data

May 31, 2021 (KR) .................... 10-2021-0069912

(51) Int. Cl.
*H10K 59/60* (2023.01)
*G06F 21/32* (2013.01)
(Continued)

(52) U.S. Cl.
CPC ............ *H10K 59/60* (2023.02); *G06F 21/32* (2013.01); *H10K 50/865* (2023.02);
(Continued)

(58) Field of Classification Search
None
See application file for complete search history.

(56) References Cited

U.S. PATENT DOCUMENTS

| 10,978,523 B2 | 4/2021 | Park et al. |
| 2020/0266249 A1 | 8/2020 | Cho |

(Continued)

FOREIGN PATENT DOCUMENTS

| JP | 2009-093050 A | 4/2009 |
| KR | 2020-0040196 A | 4/2020 |

(Continued)

OTHER PUBLICATIONS

Extended European Search Report dated Oct. 25, 2022 for corresponding European Application No. 22176348.5.

*Primary Examiner* — Michelle Mandala
(74) *Attorney, Agent, or Firm* — Harness, Dickey & Pierce, P.L.C.

(57) ABSTRACT

A sensor embedded display panel includes a substrate, a light emitting element on the substrate and including an emission layer; and a photoelectric element on the substrate. The photoelectric element includes a light absorbing layer. The light absorbing layer at least partially overlaps the emission layer in a horizontal direction extending in parallel to an upper surface of the substrate. The light emitting element and the photoelectric element each include a separate portion of a first common auxiliary layer that extends on tops of the emission layer and the light absorbing layer and a separate portion of a second common auxiliary layer that extends on bottoms of the emission layer and the light absorbing layer. The photoelectric element further includes an auxiliary layer that has a thickness corresponding to one of a red wavelength spectrum, a green wavelength spectrum, or a blue wavelength spectrum.

18 Claims, 12 Drawing Sheets

(51) Int. Cl.
  *H10K 50/86* (2023.01)
  *H10K 59/35* (2023.01)
  *H10K 59/38* (2023.01)

(52) U.S. Cl.
  CPC ......... *H10K 59/351* (2023.02); *H10K 59/353* (2023.02); *H10K 59/38* (2023.02)

(56) References Cited

U.S. PATENT DOCUMENTS

2021/0005845 A1* 1/2021 Kim .................... H10K 50/865
2021/0257420 A1   8/2021 Park et al.
2021/0327979 A1* 10/2021 Kamada .................... G09F 9/30
2021/0367022 A1* 11/2021 Tang ................. H10K 59/1216
2022/0115446 A1*  4/2022 Kamada ................. H10K 59/60

FOREIGN PATENT DOCUMENTS

WO  WO-2020/053692 A1  3/2020
WO  WO-2020/148600 A1  7/2020

\* cited by examiner

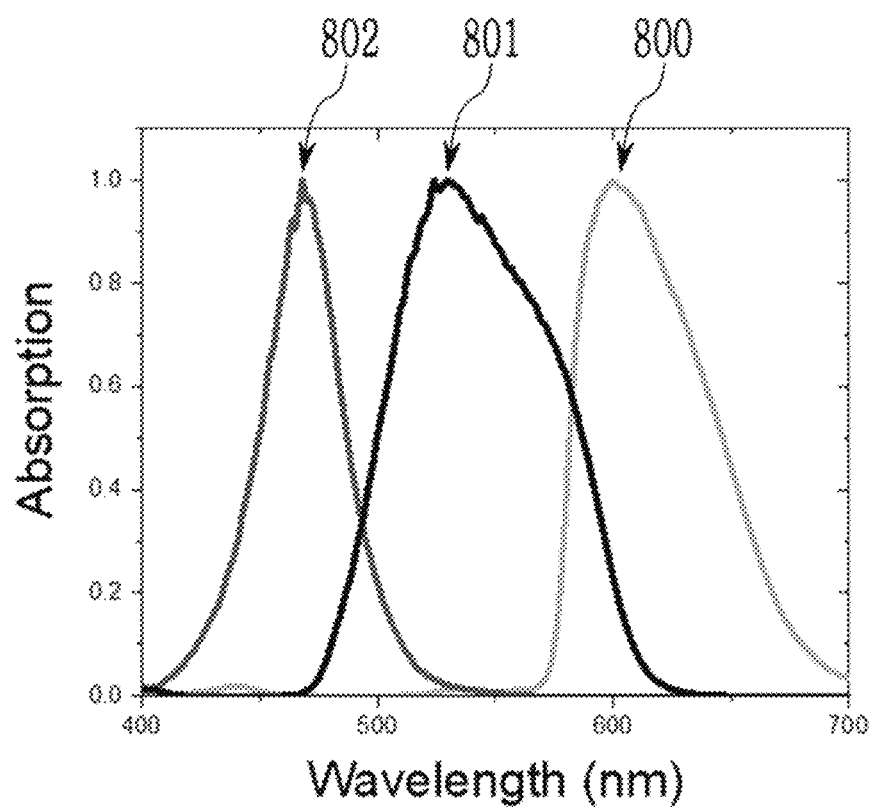

SENSOR EMBEDDED DISPLAY PANEL AND ELECTRONIC DEVICE

CROSS-REFERENCE TO RELATED APPLICATION

This application claims priority to and the benefit of, under 35 U.S.C. § 119, Korean Patent Application No. 10-2021-0069912, filed in the Korean Intellectual Property Office on May 31, 2021, the entire contents of which are incorporated herein by reference.

BACKGROUND

(a) Field

The present inventive concepts relate to sensor embedded display panels and electronic devices.

(b) Description of the Related Art

Recently, demands on display devices for realizing biometric technics for extracting specific human biometric information or behavioral feature information by use of an automated device and certifying users are increasing in the fields of finance, health care, and mobile environments.

Hence, research and development on methods and devices for combining a biometric sensor to a display panel that occupies the greatest area in the display device and integrating the same are in progress. The biometric sensor combined to the display panel may obtain touch inputs, fingerprint inputs, or images.

SUMMARY

The present inventive concepts have been made in an effort to provide sensor embedded display panels including a sensor integrated with the display panel and providing improved performance.

The present inventive concepts have been made in an effort to provide sensor embedded display panels including a sensor that may be easily manufactured.

According to some example embodiments of the present inventive concepts, a sensor embedded display panel may include a substrate; a light emitting element on the substrate and including an emission layer; and a photoelectric element on the substrate, the photoelectric element including a light absorbing layer, the light absorbing layer at least partially overlapping the emission layer in a horizontal direction extending in parallel to an upper surface of the substrate. Each of the light emitting element and the photoelectric element may include a separate portion of a first common auxiliary layer that extends on both a top of the emission layer and a top of the light absorbing layer, and a separate portion of a second common auxiliary layer that extends on both a bottom of the emission layer and a bottom of the light absorbing layer. The photoelectric element may further include an auxiliary layer that has a thickness corresponding to one of a red wavelength spectrum, a green wavelength spectrum, or a blue wavelength spectrum.

The light absorbing layer may be configured to absorb incident light of a combination of the red wavelength spectrum, the green wavelength spectrum, and the blue wavelength spectrum.

The auxiliary layer may be between the first common auxiliary layer and the light absorbing layer.

The auxiliary layer may be between the second common auxiliary layer and the light absorbing layer.

The photoelectric element may include a first sensor pixel configured to convert incident light of the red wavelength spectrum into a first electrical signal, a second sensor pixel configured to convert incident light of the green wavelength spectrum into a second electrical signal, and a third sensor pixel configured to convert incident light of the blue wavelength spectrum into a third electrical signal.

Respective thicknesses of respective auxiliary layers of the first sensor pixel, the second sensor pixel, and the third sensor pixel may be different from each other.

The photoelectric element may further include a color filter configured to selectively transmit incident light of a wavelength spectrum corresponding to the auxiliary layer.

The light emitting element and the photoelectric element may each further include a separate portion of a common electrode that is configured to apply a common voltage to the light emitting element and the photoelectric element and a pixel electrode facing the common electrode, and the first common auxiliary layer may be below the common electrode, and the second common auxiliary layer may be on the pixel electrode.

The sensor embedded display panel may include a display area configured to display an image and a non-display area that is a portion of a total area of the sensor embedded display panel that excludes the display area, and the photoelectric element may be located in the non-display area.

The sensor embedded display panel may further include: a plurality of first sub-pixels configured to display a red color and including a first light emitting element; a plurality of second sub-pixels configured to display a green color and including a second light emitting element; and a plurality of third sub-pixels configured to display a blue color and including a third light emitting element, wherein the first sub-pixels, the second sub-pixels, and the third sub-pixels may be located in the display area.

The photoelectric element may be between at least two of a first sub-pixel of the plurality of first sub-pixels, a second sub-pixel of the plurality of second sub-pixels, or a third sub-pixel of the plurality of third sub-pixels.

The sensor embedded display panel may further include a plurality of fourth sub-pixels including a fourth light emitting element configured to emit light of an infrared wavelength spectrum, wherein the photoelectric element is configured to further absorb incident light of the infrared wavelength spectrum.

The light absorbing layer may include an organic material.

The emission layer may include an organic light emitting material, a quantum dot, a perovskite, and any combination thereof.

According to some example embodiments of the inventive concepts, an image sensor may include a substrate, and a photoelectric element on the substrate, the photoelectric element including a light absorbing layer that is configured to absorb light of a combination of a red wavelength spectrum, a green wavelength spectrum, and a blue wavelength spectrum, wherein the photoelectric element may include a first common auxiliary layer at a top of the light absorbing layer, a second common auxiliary layer at a bottom of the light absorbing layer, and an auxiliary layer having a thickness corresponding to one of the red wavelength spectrum, the green wavelength spectrum, or the blue wavelength spectrum.

The auxiliary layer may be between the first common auxiliary layer and the light absorbing layer.

The auxiliary layer may be between the second common auxiliary layer and the light absorbing layer.

The photoelectric element may include a first sensor pixel configured to convert incident light of the red wavelength spectrum into a first electrical signal, a second sensor pixel configured to convert incident light of the green wavelength spectrum into a second electrical signal, and a third sensor pixel configured to convert incident light of the blue wavelength spectrum into a third electrical signal, and respective thicknesses of respective auxiliary layers of the first sensor pixel, the second sensor pixel, and the third sensor pixel are different from each other.

The photoelectric element may further include a color filter configured to selectively transmit incident light of a wavelength spectrum corresponding to the auxiliary layer.

A display device according to some example embodiments includes a sensor embedded display panel.

According to some example embodiments, the high-performance sensor integrated with the display panel to improve design and use may be provided as a merit.

According to some example embodiments, the thin display device may be provided as a merit.

BRIEF DESCRIPTION OF THE DRAWINGS

FIG. 8A and FIG. 8B show graphs of absorbance rates with respect to wavelengths of an image sensor of FIG. 7 according to some example embodiments.

DETAILED DESCRIPTION

Figure 1:
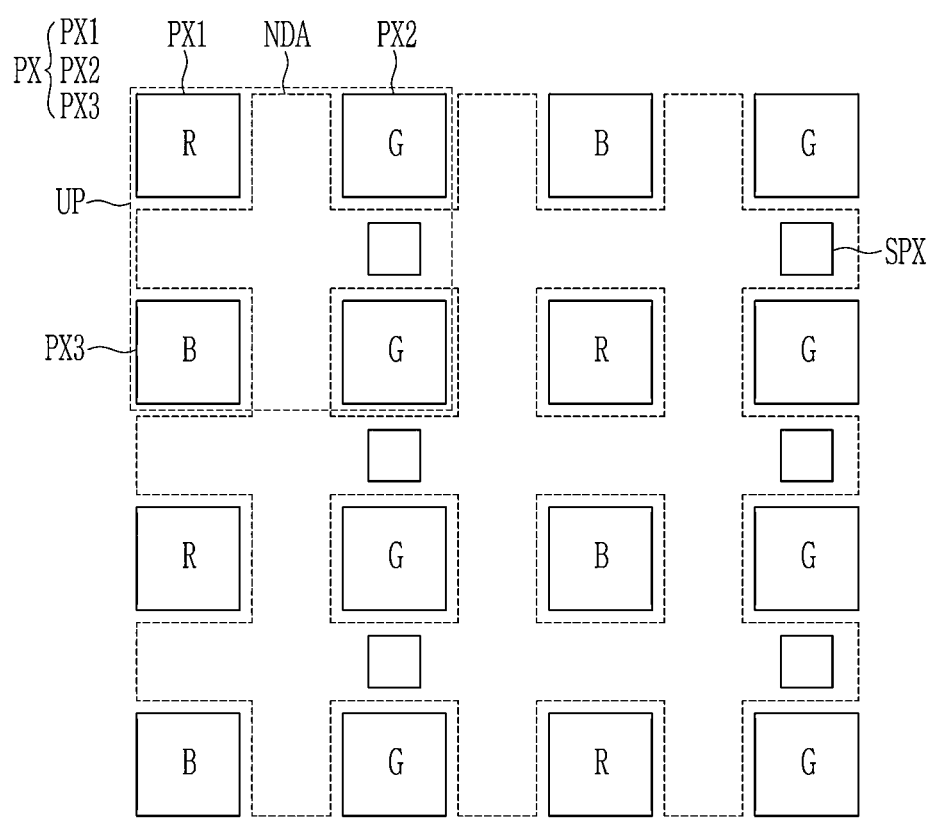
FIG. 1 shows a top plan view of a sensor embedded display panel according to some example embodiments.

The present inventive concepts will be described more fully hereinafter with reference to the accompanying drawings, in which example embodiments are shown. As those skilled in the art would realize, the described example embodiments may be modified in various different ways, all without departing from the spirit or scope of the present inventive concepts.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

The size and thickness of each configuration shown in the drawings are arbitrarily shown for better understanding and ease of description, but the present inventive concepts is not limited thereto. In the drawings, the thickness of layers, films, panels, regions, etc., are enlarged for clarity. For ease of description, the thicknesses of some layers and areas are exaggerated.

Unless explicitly described to the contrary, the word "comprise" and variations such as "comprises" or "comprising" will be understood to imply the inclusion of stated elements but not the exclusion of any other elements.

The phrase "in a plan view" means viewing a target portion from the top, and the phrase "in a cross-sectional view" means viewing a cross-section formed by vertically cutting a target portion from the side.

Parts that are irrelevant to the description will be omitted to clearly describe the present inventive concepts, and the same elements will be designated by the same reference numerals throughout the specification.

Terms of 'bottom' and 'top' are given for better understanding and ease of description and do not restrict position relationships.

The term "substituted", unless separately defined otherwise, means that a hydrogen atom in a compound is substituted with a substituent selected from among a halogen, a hydroxyl group, a nitro group, a cyano group, an amino group, an azido group, an amidino group, a hydrazino group, a hydrazono group, a carbonyl group, a carbamyl group, a thiol group, an ester group, a carboxyl group or salts thereof, a sulfonic acid group or salts thereof, a phosphoric acid or salts thereof, C1 to C30 alkyl groups, C2 to C30 alkenyl groups, C2 to C30 alkynyl groups, C6 to C30 aryl groups, C7 to C30 arylalkyl groups, C1 to C30 alkoxy groups, C1 to C20 heteroalkyl groups, C3 to C20 heterocyclic groups, C3 to C20 hetero arylalkyl groups, C3 to C30 cycloalkyl groups, C3 to C15 cycloalkenyl groups, C6 to C15 cycloalkynyl groups, C3 to C30 heterocycloalkyl groups, and combinations thereof.

As used herein, the term "hetero," unless separately defined otherwise, means that one to four heteroatoms selected from among N, O, S, Se, Te, Si, and P are contained.

Unless separately defined otherwise, an energy level is a highest occupied molecular orbital (HOMO) energy level or a lowest unoccupied molecular orbital (LUMO) energy level.

Unless separately defined otherwise, a work function or the energy level is expressed as an absolute value from a vacuum level. When the work function or the energy level is described to be deep, high, or big, it means that an absolute value is big with the vacuum level of '0 eV', and when the work function or the energy level is described to be shallow, low, or small, it means that the absolute value is small with the vacuum level of '0 eV.'

A difference of the work function and/or the energy level may be a big value of the absolute value minus a small value of the absolute value.

Unless separately defined otherwise, the HOMO energy level may be estimated with an amount of photoelectrons discharged according to energy by irradiating UV beams to a thin film by use of an AC-2 (Hitachi) or an AC-3 (Riken Keiki Co., LTD.).

Unless separately defined otherwise, the LUMO energy level may be obtained by acquiring an energy band gap by using a UV-Vis spectrometer (Shimadzu Corporation), and calculating the LUMO energy level from the energy band gap and the measured HOMO energy level.

A sensor embedded display panel according to some example embodiments will now be described.

The sensor embedded display panel according to some example embodiments may be a display panel for performing a displaying function and an image capturing function (e.g., a biometric function), and may be an in-cell type of display panel in which a sensor for performing the image capturing function (e.g., the biometric function) is installed.

Figure 2:
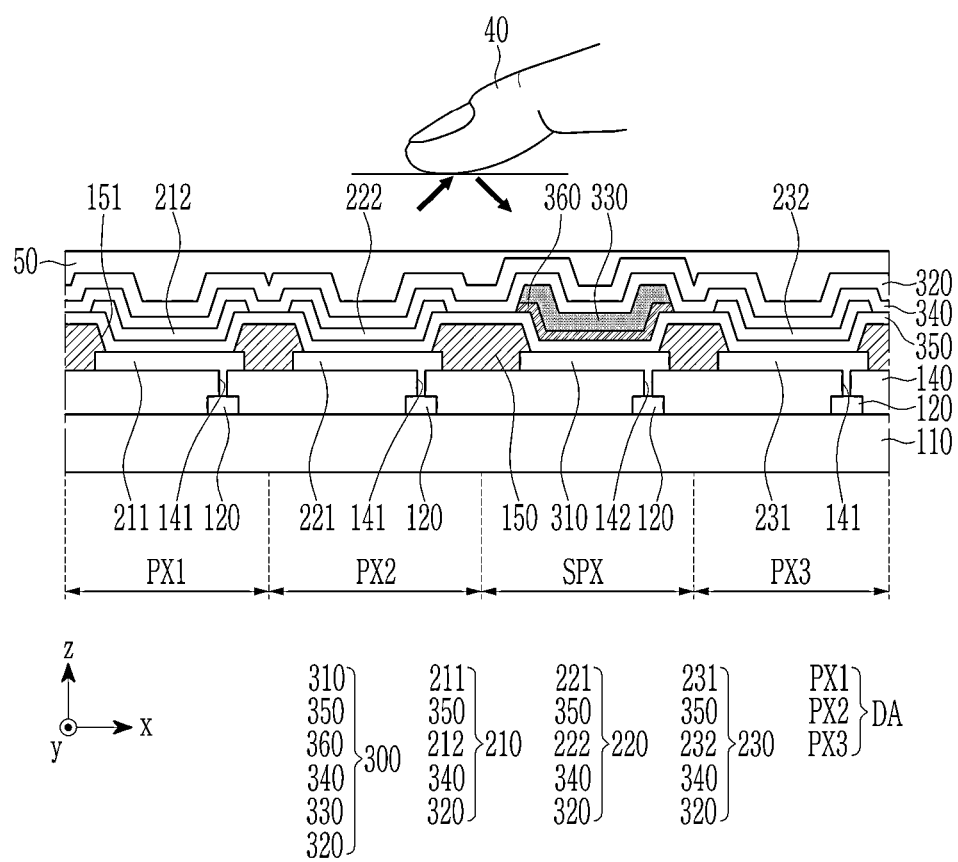
FIG. 2 shows a cross-sectional view of an example of a sensor embedded display panel according to some example embodiments.

FIG. 1 shows a top plan view of an example of a sensor embedded display panel according to some example embodiments, and FIG. 2 shows a cross-sectional view of an example of a sensor embedded display panel according to some example embodiments.

Referring to FIG. 1 and FIG. 2, the sensor embedded display panel 1000 according to some example embodiments includes a plurality of sub-pixels (PX) for displaying different colors. The sub-pixels (PX) may display at least primary colors, and for example, they include a first sub-pixel (PX1), a second sub-pixel (PX2), and a third sub-pixel (PX3) for displaying a first color, a second color, and a third color that are selected from among red, green, and blue and are different from each other. For example, the first color, the second color, and the third color may be red, green, and blue, and the first sub-pixel (PX1) may be a red sub-pixel for displaying the red (R), the second sub-pixel (PX2) may be a green sub-pixel for displaying the green (G), and the third sub-pixel (PX3) may be a blue sub-pixel for displaying the blue (B). However, without being limited thereto, auxiliary sub-pixels (not shown) such as a white sub-pixel may be further included. Displaying a color may refer to emitting light corresponding to the color (e.g., light in a wavelength spectrum of the color). Referring to FIG. 1, the sensor embedded display panel 1000 may include a plurality of first sub-pixels (PX1) configured to display a red color (e.g., light of a red wavelength spectrum) and including a first light emitting element (e.g., the first light emitting element 210 shown in FIG. 2), a plurality of second sub-pixels (PX2) configured to display a green color (e.g., light of a green wavelength spectrum) and including a second light emitting element (e.g., the second light emitting element 220 shown in FIG. 2), and a plurality of third sub-pixels (PX3) configured to display a blue color (e.g., light of a blue wavelength spectrum) and including a third light emitting element (e.g., the third light emitting element 230 shown in FIG. 2), where the first sub-pixels (PX1), the second sub-pixels (PX2), and the third sub-pixels (PX3) are located in the display area (DA).

A plurality of sub-pixels (PX) may configure a unit pixel (UP) and may be repeatedly arranged in rows and/or columns. For example, FIG. 1 shows a unit pixel (UP) including one first sub-pixel (PX1), two second sub-pixels (PX2), and one third sub-pixel (PX3), and without being limited thereto, the unit pixel (UP) may include at least one first sub-pixel (PX1), at least one second sub-pixel (PX2), and at least one third sub-pixel (PX3). An arrangement of sub-pixels (PX) in which a first column in which the first sub-pixel (PX1) and the third sub-pixel (PX3) are alternately disposed in a column direction and a second column in which the second sub-pixel (PX2) is disposed in the column direction are alternately disposed is shown in the drawing, and without being limited thereto, the arrangement of sub-pixels (PX) may be various. A region occupied by the sub-pixels (PX) and displaying colors by the sub-pixels (PX) may be the display area (DA) for displaying images. For example, the area (e.g., in the xy plane) of the sub-pixels (PX) may collectively define the display area (DA) that is configured to display an image thereon. A portion of the area (e.g., in the xy plane) of the sensor embedded display panel 1000 that excludes the display area (DA) may be a non-display area (NDA) that is configured to not display an image thereon.

The first sub-pixel (PX1), the second sub-pixel (PX2), and the third sub-pixel (PX3) may respectively include a light emitting element. For example, the first sub-pixel (PX1) may include a first light emitting element 210 for emitting light with a wavelength spectrum of the first color, the second sub-pixel (PX2) may include a second light emitting element 220 for emitting light with a wavelength spectrum of the second color, and the third sub-pixel (PX3) may include a third light emitting element 230 for emitting light with a wavelength spectrum of the third color. However, without being limited thereto, at least one of the first sub-pixel (PX1), the second sub-pixel (PX2), or the third sub-pixel (PX3) may include a light emitting element for emitting light of a combination of the first color, the second color, and the third color, that is, the light with a white wavelength spectrum, and may display the first color, the second color, or the third color through a color filter (not shown).

In addition, the sensor embedded display panel 1000 may include a fourth light emitting element (not shown) for discharging (e.g., emitting) light with (e.g., of) an infrared wavelength spectrum. For example, the fourth light emitting element may be included in one sub-pixel from among the unit pixel (UP), and may be positioned in the non-display area (NDA). Accordingly, the sensor embedded display panel 1000 may further include a plurality of fourth sub-pixels including a fourth light emitting element configured to emit light of an infrared wavelength spectrum. The fourth sub-pixel may configure one unit pixel (UP) together with the first sub-pixel (PX1), the second sub-pixel (PX2), and the third sub-pixel (PX3), and the unit pixel (UP) may be repeatedly arranged in the rows and/or the columns.

The sensor embedded display panel 1000 according to some example embodiments has an image sensor. The image sensor includes a plurality of sensor pixels (SPX). The sensor pixels (SPX) may be disposed in the non-display area (NDA), as shown for example in at least FIG. 1. The non-display area (NDA) is a region that is not the display area (DA) (e.g., a portion of the total area of the sensor embedded display panel 1000 that excludes the display area (DA)), and it may be a region in which the light emitting elements such as the first sub-pixel (PX1), the second sub-pixel (PX2), the third sub-pixel (PX3), and the auxiliary sub-pixel are not disposed. The sensor pixel (SPX) may be disposed between at least two of the first sub-pixel (PX1) (e.g., a first sub-pixel (PX1) of the plurality of first sub-pixels (PX1)), the second sub-pixel (PX2) (e.g., a second sub-pixel (PX2) of the plurality of second sub-pixels (PX2)), or the third sub-pixel (PX3) (e.g., a third sub-pixel (PX3) of the plurality of third sub-pixels (PX3)).

The sensor pixel (SPX) may include a photoelectric element 300. The photoelectric element 300 may be disposed in parallel to the first, second, and third light emitting elements 210, 220, and 230 disposed in the display area (DA).

The image sensor may be an optical type of sensor (e.g., a biometric sensor). For example, the image sensor may be a fingerprint sensor, a photoresistor, an iris sensor, a distance sensor, a blood vessel distribution sensor, and/or a heartbeat sensor, but is not limited thereto.

For example, the photoelectric element 300 may absorb the light that is discharged from at least one of the first, second, or third light emitting elements 210, 220, or 230 disposed in the display area (DA) and is reflected by a recognition target 40 such as a human body, means, or an object, and may convert the same into an electrical signal. Here, the human body may be a finger, a fingerprint, a palm, an iris, a face, and/or a wrist, but is not limited thereto.

The photoelectric element 300 may be disposed on a same plan (wherein "plan" as used herein may be interchangeably referred to as "plane") as the first, second, and third light emitting elements 210, 220, and 230 on the substrate 110, and it may be installed in the sensor embedded display panel 1000.

The sensor pixel (SPX) has been described to be positioned in the non-display area (NDA), and the sensor pixel (SPX) may be positioned in at least one of the regions in which the sub-pixels (PX1, PX2, and PX3) are positioned in the display area (DA). For example, one first sub-pixel (PX1), one second sub-pixel (PX2), one third sub-pixel (PX3), and one sensor pixel (SPX) may configure one unit pixel (UP).

Referring to FIG. 2, the sensor embedded display panel 1000 includes a substrate 110, a thin film transistor 120 disposed on the substrate 110, an insulation layer 140 disposed on the thin film transistor 120, a pixel definition layer 150 disposed on the insulation layer 140, first, second, and third light emitting elements 210, 220, and 230 on the substrate 110 and positioned in spaces partitioned by (e.g., at least partially defined by) the pixel definition layer 150, and a photoelectric element 300.

The substrate 110 may be a light transmitting substrate, for example, a glass substrate or a polymer substrate. The polymer substrate may include, for example, polycarbonate, polymethylmethacrylate, polyethylene terephthalate, polyethylene naphthalate, polyimide, polyamide, polyamideimide, polyethersulfone, polyorganosiloxane, styrene-ethylene-butylene-styrene, polyurethane, polyacryl, polyolefin, or combinations thereof, but is not limited thereto.

A plurality of thin film transistors 120 are formed on the substrate 110. At least one thin film transistor 120 may be included in each sub-pixel (PX). For example, each sub-pixel (PX) may include at least one switching thin film transistor and/or at least one driving thin film transistor. The substrate 110 on which the thin film transistor 120 is formed may be referred to as a thin film transistor substrate (TFT substrate) or a thin film transistor backplane (TFT backplane).

The insulation layer 140 may cover the substrate 110 and the thin film transistor 120, and may be positioned on a front of the substrate 110. The insulation layer 140 may be a planarization layer or a passivation layer, and may include an organic insulating material, an inorganic insulating material, an organic/inorganic insulating material, or any combination thereof. The insulation layer 140 may include a plurality of contact holes 141 for connecting the first, second, and third light emitting elements 210, 220, and 230 and the thin film transistor 120, and a plurality of contact holes 142 for electrically connecting the photoelectric element 300 and the thin film transistor 120.

The pixel definition layer 150 may be formed on the front side of the substrate 110, and it may be positioned between the adjacent sub-pixels (PX) to partition the respective sub-pixels (PX). The pixel definition layer 150 may have a plurality of openings 151 positioned on the respective sub-pixels (PX), and one of the first, second, or third light emitting elements 210, 220, or 230 or the photoelectric element 300 may be positioned in the respective openings 151.

The first, second, and third light emitting elements 210, 220, and 230 are formed on the substrate (110, or a thin film transistor substrate), and are repeatedly arranged in the side direction (e.g., xy-direction) of the substrate 110. As described above, the first, second, and third light emitting elements 210, 220, and 230 may be respectively included in the first sub-pixel (PX1), the second sub-pixel (PX2), and the third sub-pixel (PX3), and the first, second, and third light emitting elements 210, 220, and 230 may be electrically connected to the individual thin film transistor 120 and may be independently driven.

The first, second, and third light emitting elements 210, 220, and 230 may independently discharge one kind of light selected from among the red wavelength spectrum, the green wavelength spectrum, the blue wavelength spectrum, and the combination thereof. For example, the first light emitting element 210 may emit light with the red wavelength spectrum, the second light emitting element 220 may emit light with the green wavelength spectrum, and the third light emitting element 230 may emit light with the blue wavelength spectrum. Here, the red wavelength spectrum, the green wavelength spectrum, and the blue wavelength spectrum may respectively have a maximum light emitting wavelength (Amax) of equal to or greater than about 600 nm and less than 750 nm, about 500 nm to 600 nm, and equal to or greater than about 400 nm and less than 500 nm.

The first, second, and third light emitting elements 210, 220, and 230 may be light emitting diodes, for example, organic light emitting diodes (OLED) including an organic material.

The photoelectric element 300 is formed on the substrate (110, or a thin film transistor substrate), and it may be randomly or regularly arranged in the side direction (e.g., xy-direction) of the substrate 110. As described above, the sensor pixel (SPX) including the photoelectric element 300 may be positioned in the non-display area (NDA).

The photoelectric element 300 may be connected to an individual thin film transistor 120 and may be independently driven. The photoelectric element 300 may absorb the light with the same wavelength spectrum as the light discharged by at least one of the first, second, or third light emitting elements 210, 220, or 230 and may convert the same into an electrical signal, for example, it may absorb the light of the red wavelength spectrum, the green wavelength spectrum, the blue wavelength spectrum, and the combination thereof and may convert the same into the electrical signal. The photoelectric element 300 may, for example, be a photoelectric diode, and for example, it may be an organic photoelectric diode including an organic material.

For example, the sensor pixel (SPX) may have a photoelectric element 300 for absorbing the green wavelength spectrum and converting the same into an electrical signal, and may be positioned near the second sub-pixel (PX2) including the second light emitting element 220.

The first, second, and third light emitting elements 210, 220, and 230 and the photoelectric element 300 include pixel electrodes 211, 221, 231, and 310, a common electrode 320 facing the pixel electrodes 211, 221, 231, and 310 and receiving a common voltage, emission layers 212, 222, and 232 or a light absorbing layer 330 positioned between the pixel electrodes 211, 221, 231, and 310 and the common electrode 320, a first common auxiliary layer 340, and a second common auxiliary layer 350.

The first, second, and third light emitting elements 210, 220, and 230 and the photoelectric element 300 are disposed in parallel to each other in the side direction (e.g., xy-direction) of the substrate 110, which may be understood to be a horizontal direction that extends in parallel to an in-plane direction of the substrate 110 as shown in FIG. 2 and/or a horizontal direction that extends in parallel to an upper surface of the substrate 110 as shown in FIG. 2, and may share the common electrode 320, the first common auxiliary layer 340, and the second common auxiliary layer 350 formed on the front side.

The common electrode 320 is continuously formed on the top sides of the emission layers 212, 222, and 232 and the light absorbing layer 330, and is substantially formed on the front side of the substrate 110. The common electrode 320 may apply a common voltage to the first, second, and third light emitting elements 210, 220, and 230 and the photoelectric element 300. Accordingly, it will be understood that each of the first, second, and third light emitting elements 210, 220, and 230 and the photoelectric element 300 may include a separate portion of the common electrode 320 that is a single, unitary layer (e.g., single, unitary piece of material) that extends on (e.g., above or below) each of the respective emission layers 212, 222, and 232 and the light absorbing layer 330.

The first common auxiliary layer 340 may be positioned between the emission layers 212, 222, and 232 and the light absorbing layer 330, and the common electrode 320, and it may be continuously positioned on the top portions of the emission layers 212, 222, and 232 and the light absorbing layer 330 and the bottom side of the common electrode 320. Accordingly, it will be understood that each of the first, second, and third light emitting elements 210, 220, and 230 and the photoelectric element 300 may include a separate portion of the first common auxiliary layer 340 that is a single, unitary layer (e.g., single, unitary piece of material) that extends on each of the respective tops (e.g., respective top portions, respective top surfaces, etc.) of the emission layers 212, 222, and 232 and the top (e.g., top portion, top surface, etc.) of the light absorbing layer 330. As shown, the first common auxiliary layer 340 may be located below the common electrode 320. As shown in FIG. 2, the first common auxiliary layer 340 may be at a top of the light absorbing layer 330.

The first common auxiliary layer 340 may be a charge auxiliary layer (e.g., an electron auxiliary layer) for facilitating injection and/or movement of charges (e.g., electrons) to the emission layers 212, 222, and 232 from the common electrode 320. For example, the LUMO energy level of the first common auxiliary layer 340 may be positioned between the LUMO energy level of the emission layers 212, 222, and 232 and the work function of the common electrode 320, and the work function of the common electrode 320, the LUMO energy level of the first common auxiliary layer 340, and the LUMO energy levels of the emission layers 212, 222, and 232 may be shallow in order. The LUMO energy level of the first common auxiliary layer 340 may be respectively shallower than the LUMO energy level of the light absorbing layer 330 and the work function of the common electrode 320.

The first common auxiliary layer 340 may include an organic material, an inorganic material, an organic and inorganic material, or any combination thereof satisfying the LUMO energy level, for example, it may be a halogenated metal such as LiF, NaCl, CsF, RbCl, and RbI, a lanthanide metal such as Yb, a metal oxide such as $Li_2O$ or BaO, and Liq (lithium quinolate), Alq3 (tris(8-hydroxyquinolinato) aluminum), 1,3,5-tri[(3-pyridyl)-phen-3-yl]benzene, 2,4,6-tris(3'-(pyridin-3-yl)biphenyl-3-yl)-1,3,5-triazine, 2-(4-(N-phenylbenzoimidazolyl-1-ylphenyl)-9,10-dinaphthylanthracene, TPBi (1,3,5-tri(1-phenyl-1H-benzo[d]imidazol-2-yl)phenyl), BCP (2,9-dimethyl-4,7-diphenyl-1,10-phenanthroline), Bphen (4,7-diphenyl-1,10-phenanthroline), TAZ (3-(4-biphenylyl)-4-phenyl-5-tertbutylphenyl-1,2,4-triazole), NTAZ (4-(naphthalen-1-yl)-3,5-diphenyl-4H-1,2,4-triazole), tBu-PBD (2-(4-biphenylyl)-5-(4-tert-butylphenyl)-1,3,4-oxadiazole), BAlq (bis(2-methyl-8-quinolinolato-N1,O8)-(1,1'-biphenyl-4-olato)aluminum), $Bebq_2$ (berylliumbis(benzoquinolin-10-olate), ADN (9,10-di(naphthalene-2-yl)anthracene), BmPy-PhB (1,3-bis[3,5-di(pyridin-3-yl)phenyl]benzene), and any combination thereof, but is not limited thereto. The first common auxiliary layer 340 may be a single layer or more.

The second common auxiliary layer 350 is positioned between the emission layers 212, 222, and 232 and the light absorbing layer 330 and the substrate 110, and it may be positioned between the emission layers 212, 222, and 232 and the light absorbing layer 330 and the pixel electrodes 211, 221, 231, and 310. The second common auxiliary layer 350 may be continuously positioned on the bottom side of the emission layers 212, 222, and 232 and the light absorbing layer 330 and the top sides of the pixel electrodes 211, 221, 231, and 310. Accordingly, it will be understood that each of the first, second, and third light emitting elements 210, 220, and 230 and the photoelectric element 300 may include a separate portion of the second common auxiliary layer 350 that is a single, unitary layer (e.g., single, unitary piece of material) that extends on each of the respective bottoms (e.g., respective bottom portions, respective bottom surfaces, etc.) of the emission layers 212, 222, and 232 and the bottom (e.g., bottom portion, bottom surface, etc.) of the light absorbing layer 330. As shown, the second common auxiliary layer 350 may be located on (e.g., above) the pixel electrodes 211, 221, and 231. As shown in FIG. 2, the second common auxiliary layer 350 may be at a bottom of the light absorbing layer 330.

The second common auxiliary layer 350 may be a charge auxiliary layer (e.g., a hole auxiliary layer) for facilitating injection and/or movement of charges (e.g., holes) to the emission layers 212, 222, and 232 from the pixel electrodes 211, 221, and 231. For example, the HOMO energy level of the second common auxiliary layer 350 may be positioned between the HOMO energy levels of the emission layers 212, 222, and 232 and the work function of the pixel electrodes 211, 221, and 231, and the work functions of the pixel electrodes 211, 221, and 231, the HOMO energy level of the second common auxiliary layer 350, and the HOMO energy levels of the emission layers 212, 222, and 232 may be deepened in order.

The second common auxiliary layer 350 may include an organic material, an inorganic material, an organic and inorganic material, and any combination thereof satisfying the HOMO energy level, for example, it may be a phthalocyanine compound such as copper phthalocyanine, DNTPD (N,N'-diphenyl-N,N'-bis-[4-(phenyl-m-tolyl-amino)-phenyl]-biphenyl-4,4'-diamine), m-MTDATA (4,4',4"-[tris(3-methylphenyl)phenylamino]triphenylamine), TDATA (4,4'4"-tris(N,N-diphenylamino)triphenylamine), 2-TNATA (4,4',4"-tris{N-(2-naphthyl)-N-phenylamino}-triphenylamine), PEDOT/PSS (poly(3,4-ethylenedioxythiophene)/poly(4-styrenesulfonate)), PANI/DBSA (polyaniline/dodecylbenzenesulfonic acid), PANI/CSA (polyaniline/camphor sulfonic acid), PANI/PSS (polyaniline/poly(4-styrenesulfonate)), NPB (N,N'-di(naphthalene-1-yl)-N,N'-diphenylbenzidine), polyetherketone (TPAPEK) including triphenylamine, 4-isopropyl-4'-methyldiphenyliodonium[tetrakis(pentafluorophenyl)borate], HAT-CN (dipyrazino[2,3-f:2',3'-h]quinoxaline-2,3,6,7,10,11-hexacarbonitrile), carbazole-based derivatives such as N-phenylcarbazole or polyvinylcarbazole, a fluorine-based derivative, triphenylamine-based derivatives such as TPD (N,N'-bis(3-methylphenyl)-N,N'-diphenyl-[1,1-biphenyl]-4,4'-diamine) or TCTA (4,4',4"-tris(N-carbazolyl)triphenylamine), NPB (N,N'-di(naphthalene-1-yl)-N,N'-diphenyl-benzidine), TAPC (4,4'-cyclohexylidene bis[N,N-bis(4-methylphenyl)benzenamine]), HMTPD (4,4'-bis[N,N'-(3-tolyl)amino]-3,3'-dimethylbiphenyl), mCP (1,3-bis(N-carbazolyl)benzene), or combinations thereof, but is not limited thereto. The second common auxiliary layer 350 may be a single layer or more.

The auxiliary layer 360 may be positioned between the light absorbing layer 330 and the second common auxiliary layer 350 and/or between the first common auxiliary layer 340 and the light absorbing layer 330.

When the auxiliary layer 360 is positioned between the light absorbing layer 330 and the second common auxiliary layer 350, the auxiliary layer 360 may be a charge auxiliary layer (e.g., a hole auxiliary layer) for facilitating injection and/or movement of charges (e.g., holes) to the light absorbing layer 330 from the pixel electrode 310. For example, the auxiliary layer 360 may include a same material as the second common auxiliary layer 350. Restated, the auxiliary layer 360 and the second common auxiliary layer 350 may be compositionally the same. For example, the auxiliary layer 360 and the second common auxiliary layer 350 may have a same total material composition. The auxiliary layer 360 may be part of the second common auxiliary layer 350 and may be manufactured by a same manufacturing process.

When the auxiliary layer 360 is positioned between the first common auxiliary layer 340 and the light absorbing layer 330, the auxiliary layer 360 may be a charge auxiliary layer (e.g., an electron auxiliary layer) for facilitating injection and/or movement of the charges (e.g., electrons) to the light absorbing layer 330 from the common electrode 320. For example, the auxiliary layer 360 may include a same material as the first common auxiliary layer 340. The auxiliary layer 360 may be part of the first common auxiliary layer 340 and may be manufactured by a same manufacturing process.

The auxiliary layer 360 may have a thickness (e.g., in the z direction as shown in FIG. 2, extending perpendicular to an in-plane direction of the substrate 110 and/or perpendicular to the upper surface of the substrate 110) that corresponds to the wavelength spectrum of the light to be converted into an electrical signal by the photoelectric element 300 (e.g., a thickness corresponding to one of a red wavelength spectrum, a green wavelength spectrum, or a blue wavelength spectrum), which will be described in a later portion of the present specification.

The respective first, second, and third light emitting elements 210, 220, and 230 and the photoelectric element 300 include pixel electrodes 211, 221, 231, and 310 facing the common electrode 320. One of the pixel electrodes 211, 221, 231, and 310 or the common electrode 320 is an anode and the other is a cathode. For example, the pixel electrodes 211, 221, 231, and 310 may be anodes and the common electrode 320 may be a cathode. The pixel electrodes 211, 221, 231, and 310 are respectively separated for the respective sub-pixels (PX), and may be respectively connected to the individual thin film transistor 120 and may be independently driven.

The pixel electrodes 211, 221, 231, and 310 and the common electrode 320 may respectively be a light transmitting electrode or a reflecting electrode, for example, at least one of the pixel electrodes 211, 221, 231, and 310 or the common electrode 320 may be a light transmitting electrode.

The light transmitting electrode may be a transparent electrode or a semi-transmission electrode, the transparent electrode may have a light transmission ratio that is equal to or greater than about 85%, equal to or greater than about 90%, or equal to or greater than about 95%, and the semi-transmission electrode may have a light transmission ratio that is equal to or greater than about 30% and less than about 85%, about 40% to about 80%, or about 40% to 75%. The transparent electrode and the semi-transmission electrode may, for example, include at least one of an oxide conductor, a carbon conductor, or a metal thin film. The oxide conductor may, for example, be at least one of an indium tin oxide (ITO), an indium zinc oxide (IZO), a zinc tin oxide (ZTO), an aluminum tin oxide (ATO), or an aluminum zinc oxide (AZO), the carbon conductor may be at least one of graphene or a carbon nanomaterial, and the metal thin film may be a very thin film include aluminum (Al), magnesium (Mg), silver (Ag), gold (Au), magnesium-silver (Mg—Ag), magnesium-aluminum (Mg—Al), an alloy thereof, or any combination thereof.

The reflecting electrode may include a reflection layer with equal to or less than about 5% of the light transmission ratio and/or equal to or greater than about 80% of the reflection ratio, and the reflection layer may include an optically opaque material. The optically opaque material may include a metal, a metal nitride, or any combination thereof, for example, it may include silver (Ag), copper (Cu), aluminum (Al), gold (Au), titanium (Ti), chromium (Cr), nickel (Ni), an alloy thereof, a nitride (e.g., TiN) thereof, or any combination thereof, but is not limited thereto. The reflecting electrode may be made of a reflection layer, it may have a stacking structure of a reflection layer/light transmitting layer or a light transmitting layer/reflection layer/light transmitting layer, and the reflection layer may be a single layer or more.

For example, when the pixel electrodes 211, 221, 231, and 310 are light transmitting electrodes and the common electrode 320 is a reflecting electrode, the sensor embedded display panel 1000 may be a bottom emission type of display panel for emitting light toward the substrate 110. For example, when the pixel electrodes 211, 221, 231, and 310 are reflecting electrodes and the common electrode 320 is a light transmitting electrode, the sensor embedded display panel 1000 may be a top emission type of display panel for emitting light to an opposite side of the substrate 110. For example, when the pixel electrodes 211, 221, 231, and 310 and the common electrode 320 are respectively a light transmitting electrode, the sensor embedded display panel 1000 may be a both side emission type of display panel.

For example, the pixel electrodes 211, 221, 231, and 310 may be reflecting electrodes, the common electrode 320 may be a semi-transmission electrode, and in this case, the sensor embedded display panel 1000 may form a microcavity structure. Regarding the microcavity structure, light is repeatedly reflected between the reflecting electrode and the semi-transmission electrode by a predetermined optical length (e.g., a distance between the semi-transmission electrode and the reflecting electrode) to thus reinforce the light with a predetermined wavelength spectrum and improve an optical characteristic.

For example, the light with a predetermined wavelength spectrum from among the light emitted by the emission layers 212, 222, and 232 of the first, second, and third light emitting elements 210, 220, and 230 may be repeatedly reflected between the semi-transmission electrode and the reflecting electrode and may then be modified, and the light with the wavelength spectrum that corresponds to a resonance wavelength of the microcavity from among the modified light may be reinforced and may display an amplified light emitting characteristic in a narrow wavelength region. Accordingly, the sensor embedded display panel 1000 may express colors with high color purity.

The light with a predetermined wavelength spectrum from among the light that is input to the photoelectric element 300 may be repeatedly reflected between the semi-transmission electrode and the reflecting electrode and may then be modified, and the light with a wavelength spectrum that corresponds to the resonance wavelength of the microcavity from among the modified light may be reinforced and may display an amplified photoelectric conversion characteristic in the narrow wavelength region. Accordingly, the photoelectric element 300 may display a high photoelectric conversion characteristic in the narrow wavelength region. For example, when the light absorbing layer 330 of the photoelectric element 300 selectively absorbs the light with a green wavelength spectrum having a maximum absorption wavelength of 500 nm to 600 nm, the optical length between the semi-transmission electrode and the reflecting electrode by which the green wavelength spectrum is reinforced may be determined to be a thickness of the auxiliary layer 360.

The respective first, second, and third light emitting elements 210, 220, and 230 include emission layers 212, 222, and 232 positioned between the pixel electrodes 211, 221, and 231 and the common electrode 320. The emission layer 212 included in the first light emitting element 210, the emission layer 222 included in the second light emitting element 220, and the emission layer 232 included in the third light emitting element 230 may emit light with the same wavelength spectrum or different wavelength spectrums, for example, they may emit light with the red wavelength spectrum, the green wavelength spectrum, the blue wavelength spectrum, or any combination thereof.

For example, when the first light emitting element 210, the second light emitting element 220, and the third light emitting element 230 are respectively a red light emitting element, a green light emitting element, and a blue light emitting element, the emission layer 212 included in the first light emitting element 210 may be a red emission layer for emitting light with the red wavelength spectrum, the emission layer 222 included in the second light emitting element 220 may be a green emission layer for emitting light with the green wavelength spectrum, and the emission layer 232 included in the third light emitting element 230 may be a blue emission layer for emitting light with the blue wavelength spectrum. Here, the red wavelength spectrum, the green wavelength spectrum, and the blue wavelength spectrum may respectively have the maximum light emitting wavelength of equal to or greater than about 600 nm and less than 750 nm, about 500 nm to 600 nm, and equal to or greater than about 400 nm and less than 500 nm.

For example, when at least one of the first light emitting element 210, the second light emitting element 220, or the third light emitting element 230 is a white light emitting element, the emission layer of the white light emitting element may emit light with the full-wavelength spectrum of visible rays, for example, the light with the wavelength spectrum of equal to or greater than about 380 nm and less than 750 nm, about 400 nm to 700 nm, or about 420 nm to 700 nm.

The emission layers 212, 222, and 232 may include at least one host material and a fluorescent or phosphorescence dopant, and at least one of the at least one host material or the fluorescent or phosphorescence dopant may be an organic material. The organic material may, for example, include a low molecular organic material, and may, for example, include an organic material having a deposition property. The emission layers 212, 222, and 232 may include an organic light emitting material, a quantum dot, a perovskite, and any combination thereof.

In addition, the fourth light emitting element is disposed on the substrate 110, and may be disposed on a same plan as the first, second, and third light emitting elements 210, 220, and 230 and the photoelectric element 300. A stacking structure of the fourth light emitting element corresponds to the first to third light emitting elements 210, 220, and 230. The emission layer of the fourth light emitting element may emit light with the wavelength spectrum of infrared rays, for example, it may have the maximum light emitting wavelength of equal to or greater than about 750 nm, about 750 nm to 20 µm, about 780 nm to 20 µm, about 800 nm to 20 µm, about 750 nm to 15 µm, about 780 nm to 15 µm, about 800 nm to 15 µm, about 750 nm to 10 µm, about 780 nm to 10 µm, about 800 nm to 10 µm, about 750 nm to 5 µm, about 780 nm to 5 µm, about 800 nm to 5 µm, about 750 nm to 3 µm, about 780 nm to 3 µm, about 800 nm to 3 µm, about 750 nm to 2 µm, about 780 nm to 2 µm, about 800 nm to 2 µm, about 750 nm to 1.5 µm, about 780 nm to 1.5 µm, or about 800 nm to 1.5 µm.

The photoelectric element 300 includes a light absorbing layer 330 positioned between the pixel electrode 310 and the common electrode 320. The light absorbing layer 330 may be disposed in parallel to the emission layers 212, 222, and 232 of the first, second, and third light emitting elements 210, 220, and 230 in the side direction (e.g., xy-direction) of the substrate 110, and the light absorbing layer 330 and the emission layers 212, 222, and 232 may be positioned on the same plan. For example, as shown in at least FIG. 2, the light absorbing layer 330 of the photoelectric element 300 may at least partially overlap the emission layers 212, 222, and 232 of the first, second, and third light emitting elements 210, 220, and 230 in the side direction (e.g., xy-direction) of the substrate 110, which may be understood to be a horizontal direction that extends in parallel to an in-plane direction of the substrate 110 as shown in FIG. 2 and/or a horizontal direction that extends in parallel to an upper surface of the substrate 110 as shown in FIG. 2, and the light absorbing layer 330 and the emission layers 212, 222, and 232 may be at least partially positioned on the same plan (e.g., an xy plane extending the xy directions that intersects each of the light absorbing layer 330 and the emission layers 212, 222, and 232).

The light absorbing layer 330 may be a photoelectric conversion layer for absorbing light with a predetermined wavelength spectrum and converting the same into an electrical signal, and it may absorb the light that is output by at least one of the first, second, or third light emitting elements 210, 220, or 230 and is reflected by the recognition target 40 and may convert the same into an electrical signal. The light absorbing layer 330 may, for example, absorb the light with the red wavelength spectrum, the green wavelength spectrum, the blue wavelength spectrum, the infrared ray wavelength spectrum, and any combination thereof.

For example, the light absorbing layer 330 may absorb the light (e.g., incident light) with the red wavelength spectrum, the green wavelength spectrum, and the blue wavelength spectrum, that is, the light with the full wavelength spectrum of the visible rays of equal to or greater than about 380 nm and less than 750 nm, and when a combination of lights emitted by the first, second, and third light emitting elements 210, 220, and 230 is reflected by the recognition target 40, the light absorbing layer 330 may absorb the reflected light. For example, the light absorbing layer 330 may be configured to absorb incident light of a combination of the red wavelength spectrum, the green wavelength spectrum, and the blue wavelength spectrum.

For example, the light absorbing layer 330 may selectively absorb the light with the red wavelength spectrum having the maximum absorption wavelength of greater than about 600 nm and less than 750 nm, and when the light emitted by the red light emitting element from among the first, second, and third light emitting elements 210, 220, and 230 is reflected by the recognition target 40, the light absorbing layer 330 may absorb the reflected light.

For example, the light absorbing layer 330 may selectively absorb the light with the green wavelength spectrum having the maximum absorption wavelength of about 500 nm to 600 nm, and when the light emitted by the green light emitting element from among the first, second, and third light emitting elements 210, 220, and 230 is reflected by the recognition target 40, the light absorbing layer 330 may absorb the reflected light.

For example, the light absorbing layer 330 may selectively absorb the light with the blue wavelength spectrum having the maximum absorption wavelength of equal to or greater than about 380 nm and less than 500 nm, and when the light emitted by the blue light emitting element from among the first, second, and third light emitting elements 210, 220, and 230 is reflected by the recognition target 40, the light absorbing layer 330 may absorb the reflected light.

The light absorbing layer 330 may include a p-type semiconductor and/or an n-type semiconductor for performing photoelectric conversion on the absorbed light. The p-type semiconductor and the n-type semiconductor may form a pn junction, and they may receive light from the outside to generate excitons and may divide the generated excitons into holes and electrons. The p-type semiconductor and the n-type semiconductor may respectively include one type or more, and at least one of the p-type semiconductor or the n-type semiconductor may be a light absorbing material for absorbing the light with at least part of the wavelength spectrum from among the visible ray wavelength spectrum. For example, the p-type semiconductor and/or the n-type semiconductor may be a light absorbing material for absorbing the light with the visible ray wavelength spectrum. For example, the p-type semiconductor and/or the n-type semiconductor may be light absorbing materials for selectively absorbing one or two of the red wavelength spectrum, the green wavelength spectrum, or the blue wavelength spectrum, and they may combine a plurality of materials for absorbing light with different wavelength spectrums and may absorb the light with the visible ray wavelength spectrum. The p-type semiconductor and/or the n-type semiconductor may be an organic light-absorbing material.

For example, the light absorbing layer 330 may include an organic light-absorbing material for selectively absorbing the light with the green wavelength spectrum, for example, it may include the p-type semiconductor for selectively absorbing the light with the green wavelength spectrum.

The p-type semiconductor may be an organic material, an inorganic material, or an organic and inorganic material satisfying a predetermined HOMO energy level, for example, it may have the HOMO energy level of about 5.0 to 6.0 eV, about 5.1 to 5.9 eV, about 5.2 to 5.8 eV, or about 5.3 to 5.8 eV.

The p-type semiconductor may be a low molecular organic compound that may be deposited, for example, it may be an organic compound including an electron donating moiety and an electron accepting moiety, and for example, it may be expressed as Formula A.

EDM-LM-EAM [Formula A]

In Formula A,
EDM may be an electron donating moiety,
EAM may be an electron accepting moiety, and
LM may be a pi conjugation connecting moiety for connecting the electron donating moiety and the electron accepting moiety.

For example, the p-type semiconductor (a green p-type semiconductor hereinafter) for selectively absorbing light with the green wavelength spectrum may, for example, be an organic compound expressed in Formula A-1.

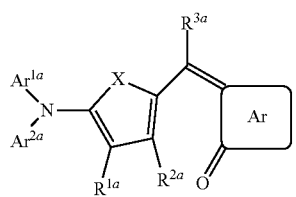

[Formula A-1]

In Formula A-1,
X may be O, S, Se, Te, SO, $SO_2$, $CR^bR^c$, or $SiR^dR^e$,
Ar may be substituted or unsubstituted C6 to C30 arylene groups, substituted or unsubstituted C3 to C30 heterocyclic groups, or two or more fused rings selected therefrom,
$Ar^{1a}$ and $Ar^{2a}$ may respectively be independently substituted or unsubstituted C6 to C30 aryl(ene) groups or substituted or unsubstituted C3 to C30 hetero aryl(ene) groups,
$R^{1a}$ to $R^{3a}$ and $R^b$ to $R^e$ may respectively be independently hydrogen, substituted or unsubstituted C1 to C30 alkyl groups, substituted or unsubstituted C1 to C30 alkoxy groups, substituted or unsubstituted C6 to C30 aryl groups, substituted or unsubstituted C3 to C30 hetero aryl groups, halogens, cyano groups, or combinations thereof, and
$Ar^{1a}$, $Ar^{2a}$, $R^{1a}$, and $R^{2a}$ may respectively exist independently or adjacent two thereof may be combined to each other to configure a ring.

For example, $Ar^{1a}$ and $Ar^{2a}$ may respectively independently be a substituted or unsubstituted phenyl group, a substituted or unsubstituted naphthyl group, a substituted or unsubstituted anthracenyl group, a substituted or unsubstituted phenanthrenyl group, a substituted or unsubstituted pyridinyl group, a substituted or unsubstituted pyridazinyl group, a substituted or unsubstituted pyrimidinyl group, a substituted or unsubstituted pyrazinyl group, a substituted or unsubstituted quinolinyl group, a substituted or unsubstituted isoquinolinyl group, a substituted or unsubstituted naphthyridinyl group, a substituted or unsubstituted cinnolinyl group, a substituted or unsubstituted quinazolinyl group, a substituted or unsubstituted phthalazinyl group, a substituted or unsubstituted benzotriazinyl group, a substituted or unsubstituted pyridopyrazinyl group, a substituted or unsubstituted pyridopyrimidinyl group, or a substituted or unsubstituted pyridopyridazinyl group.

For example, $Ar^{1a}$ and $Ar^{2a}$ may be fused with each other to form a ring.

For example, $Ar^{2a}$ and $R^{1a}$ may be fused with each other to form a ring.

In detail, the green p-type semiconductor may be expressed as in Formula A-1-1 or A-1-2.

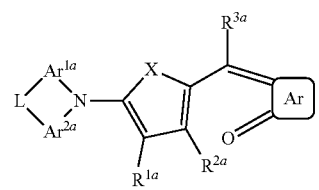

[Formula A-1-1]

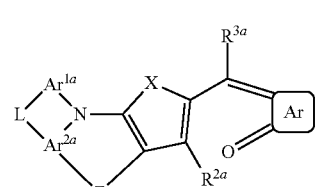

[Formula A-1-2]

In formulae A-1-1 and A-1-2,
X may be O, S, Se, Te, SO, $SO_2$, $CR^bR^c$, or $SiR^dR^e$,
Ar may be substituted or unsubstituted C6 to C30 arylene groups, substituted or unsubstituted C3 to C30 heterocyclic groups, or two or more fused rings selected therefrom,
$Ar^{1a}$ and $Ar^{2a}$ may respectively be independently substituted or unsubstituted C6 to C30 arylene groups or substituted or unsubstituted C3 to C30 hetero arylene groups,
L and Z may respectively be independently a single bond, O, S, Se, Te, SO, $SO_2$, $CR^fR^g$, $SiR^hR^i$, $GeR^jR^k$, $NR^l$, substituted or unsubstituted C1 to C30 alkylene groups, substituted or unsubstituted C3 to C30 cycloalkylene groups, substituted or unsubstituted C6 to C30 arylene groups, or combinations thereof,
$R^{1a}$, $R^{2a}$, $R^{3a}$, and $R^b$ to $R^l$ may respectively be independently hydrogen, substituted or unsubstituted C1 to C30 alkyl groups, substituted or unsubstituted C1 to C30 alkoxy groups, substituted or unsubstituted C6 to C30 aryl groups, substituted or unsubstituted C3 to C30 hetero aryl groups, halogens, cyano groups, or combinations thereof.

The n-type semiconductor may be an organic material, an inorganic material, or an organic and inorganic material for satisfying a predetermined LUMO energy level, for example, it may have the LUMO energy level of equal to or greater than 3.3 eV, equal to or greater than 3.4 eV, equal to or greater than 3.5 eV, equal to or less than 5.5 eV, equal to or less than 5.3 eV, or equal to or less than 5.0 eV. The n-type semiconductor may, for example, include fullerene or a fullerene derivative such as $C_{60}$, $C_{70}$, $C_{78}$, or $C_{80}$; thiophene or a thiophene derivative; perylene diimide or its derivative; naphthalene diimide or its derivative; a metal organic complex or its derivative such as tris(8-hydroxyquinolinato) aluminum ($Alq_3$), subphthalocyanine (SubPc), or phthalocyanine (Pc); or combinations thereof, but is not limited thereto.

The light absorbing layer 330 may be an intrinsic layer (I-layer) on which the p-type semiconductor and the n-type semiconductor are mixed in a bulk heterojunction form. In this instance, the p-type semiconductor and the n-type semiconductor may be mixed with a volume ratio (thickness ratio) of about 1:9 to 9:1, they may be mixed, for example, with the volume ratio (thickness ratio) of about 2:8 to 8:2 within the range, they may be mixed, for example, with the volume ratio (thickness ratio) of about 3:7 to 7:3 within the range, they may be mixed, for example, with the volume ratio (thickness ratio) of about 4:6 to 6:4 within the range, and they may be mixed, for example, with the volume ratio (thickness ratio) of about 5:5 within the range.

The light absorbing layer 330 may include a p-layer and/or an n-layer instead of the intrinsic layer (I-layer), or may further include a p-layer and/or an n-layer position at the top and/or the bottom of the intrinsic layer (I-layer). The p-layer may, for example, include a third organic material, and the n-layer may, for example, include the second organic material. The light absorbing layer 330 may, for example, be an I-layer, a p-layer/n-layer, a p-layer/i-layer, an i-layer/n-layer, or a p-layer/i-layer/n-layer, but is not limited thereto.

The thicknesses of the emission layers 212, 222, and 232 and the light absorbing layer 330 may respectively be about 5 nm to 300 nm, and may be about 10 nm to 250 nm, about 20 nm to 200 nm, or about 30 nm to 180 nm within the range. A thickness difference between the emission layers 212, 222, and 232 and the light absorbing layer 330 may be equal to or less than about 20 nm, it may be equal to or less than about 15 nm, equal to or less than about 10 nm, or equal to or less than about 5 nm within the range, and the thicknesses of the emission layers 212, 222, and 232 and the light absorbing layer 330 may be the same or substantially the same.

An encapsulation layer 50 is formed on the first, second, and third light emitting elements 210, 220, and 230 and the photoelectric element 300. The encapsulation layer 50 may, for example, include a glass plate, a metal thin film, an organic film, an inorganic film, an organic/inorganic film, or any combination thereof. The organic film may, for example, include an acryl resin, a (metha)acryl resin, polyisoprene, a vinyl resin, an epoxy resin, a urethane resin, a cellulose resin, a perylene resin, or any combination thereof, but is not limited thereto. The inorganic film may, for example, include an oxide, a nitride, and/or an oxynitride, for example, it may be a silicon oxide, a silicon nitride, a silicon oxynitride, an aluminum oxide, an aluminum nitride, an aluminum oxynitride, a zirconium oxide, a zirconium nitride, a zirconium oxynitride, a titanium oxide, a titanium nitride, a titanium oxynitride, a hafnium oxide, a hafnium nitride, a hafnium oxynitride, a tantalum oxide, a tantalum nitride, a tantalum oxynitride, a lithium fluoride, or any combination thereof, but is not limited thereto. The organic/inorganic film may, for example, include polyorganosiloxane, but is not limited thereto. The encapsulation layer 50 may be a single layer or more.

The sensor embedded display panel 1000 according to some example embodiments includes first, second, and third light emitting elements 210, 220, and 230 for displaying colors by emitting light with a predetermined wavelength spectrum, and a photoelectric element 300 for absorbing the light reflected by the recognition target 40 and converting the same into an electrical signal on the same plan on the substrate 110, thereby executing the displaying function and the image capturing function (e.g., a biometric function). Accordingly, differing from the existing display panel for manufacturing the sensor as an individual module and attaching the same to the outside of the display panel (e.g., mounted on an external portion of the display panel) or forming the same sensor at the bottom of the display panel, improved performance may be obtained without increasing the thickness, so the slim high-performance sensor embedded display panel 1000 may be realized. Accordingly, performance may be improved in relation to existing display panel designs wherein when the sensor is disposed at the bottom of the display panel, an object must be recognized while passing through the display panel, various films, and/or components, so performance may be deteriorated. Additionally, limitations in design and use may be overcome in relation to existing display panel designs wherein when the sensor is manufactured to be an additional module and is mounted, there are limits in design and use.

The light with a wavelength spectrum corresponding to the resonance wavelength in a microcavity structure caused by the auxiliary layer 360 may be reinforced, and the photoelectric element 300 may show an amplified photoelectric conversion characteristic in the narrow wavelength region. Hence, the photoelectric element 300 may show a high photoelectric conversion characteristic in the narrow wavelength region.

The photoelectric element 300 uses the light emitted by the first, second, and third light emitting elements 210, 220, and 230 so it may perform the image capturing function (e.g., a biometric function) without an additional light source. Therefore, there is no need to install an individual light source outside the display panel to thus prevent deterioration of an aperture ratio of the display panel caused by an area occupied by the light source, also reduce electric power consumed by the additional light source, and accordingly reduce power consumption of the sensor embedded display panel 1000.

Further, as described above, the first, second, and third light emitting elements 210, 220, and 230 and the photoelectric element 300 share the common electrode 320, the first common auxiliary layer 340, and the second common auxiliary layer 350, thereby simplifying the structure and the process in comparison to the case in which the first, second, and third light emitting elements 210, 220, and 230 and the photoelectric element 300 are formed by an individual process.

The photoelectric element 300 may be an organic photoelectric diode including an organic light absorbing layer, and hence, it may have optical absorption that is greater than that of the inorganic diode such as the silicon photodiode by equal to or greater than twice, so it may have a high-sensitivity sensing function with a reduced thickness.

The photoelectric element 300 may be disposed at any points in the non-display area (NDA), so as many as needed may be disposed at the desired positions of the sensor embedded display panel 1000. Therefore, for example, by randomly or irregularly disposing the photoelectric element 300 on the sensor embedded display panel 1000, the biometric function may be executed at any part of a screen of an electronic device such as a mobile device, and the biometric function may be selectively executed on a specific position requiring the biometric function according to selection of the user.

In addition, when the light emitted by the fourth light emitting element for emitting light with an infrared ray wavelength spectrum (also referred to herein as an infrared wavelength spectrum) is reflected by the recognition target 40, the photoelectric element 300 may absorb the reflected light and may convert the same into an electrical signal. Where the photoelectric element 300 (e.g., the light absorbing layer 330 thereof) is configured to absorb incident light of a combination of a red wavelength spectrum, a green wavelength spectrum, and a blue wavelength spectrum, the photoelectric element 300 (e.g., the light absorbing layer 330) may be further configured to absorb incident light of the infrared wavelength spectrum. In this case, the light absorbing layer 330 of the photoelectric element 300 may include an organic material, an inorganic material, an organic and inorganic material, or combinations thereof for selectively absorbing light within the infrared ray wavelength spectrum, for example, it may include a quantum dot, a quinoid metal complex compound, a polymethine compound, a cyanine compound, a phthalocyanine compound, a merocyanine compound, a naphthalocyanine compound, an immonium compound, a diimmonium compound, a trianarylmethane compound, a dipyrromethene compound, an anthraquinone compound, a naphthoquinone compound, a diquinone compound, a naphthoquinone compound, an anthraquinone compound, a squarylium compound, a rylene compound, a perylene compound, a squaraine compound, a pyrylium compound, a thiopyrylium compound, a diketopyrrolopyrrole compound, a boron dipyrromethene compound, a nickel-dithiol complex compound, a croconium compound, derivatives thereof, or combinations thereof, but is not limited thereto. For example, a material for selectively absorbing light with the infrared ray wavelength spectrum may be included as a p-type semiconductor, and the above-described second organic material may be included as an n-type semiconductor.

The sensor embedded display panel 1000 includes the fourth light emitting element for emitting light with the infrared ray wavelength spectrum and the photoelectric element 300 for absorbing light with the infrared ray wavelength spectrum, thereby improving sensitivity of the photoelectric element 300 in the condition of low intensity of illumination as well as the biometric function according to some example embodiments, and further increasing sensing performance of three dimensional (3D) images by widening a dynamic range for detailed distinguishing of black and white contrasts. Therefore, the sensing performance of the sensor embedded display panel 1000 may be further improved. Particularly, the light with the infrared ray wavelength spectrum may permeate into the living body deeper because of the long wavelength characteristic and may efficiently obtain information positioned at different distances, so an image or a change of blood vessels such as veins, and an iris and/or a face in addition to fingerprints may be efficiently sensed, and a use range may be further widened.

Another example of a sensor embedded display panel 1000 according to some example embodiments will now be described.

Figure 3:
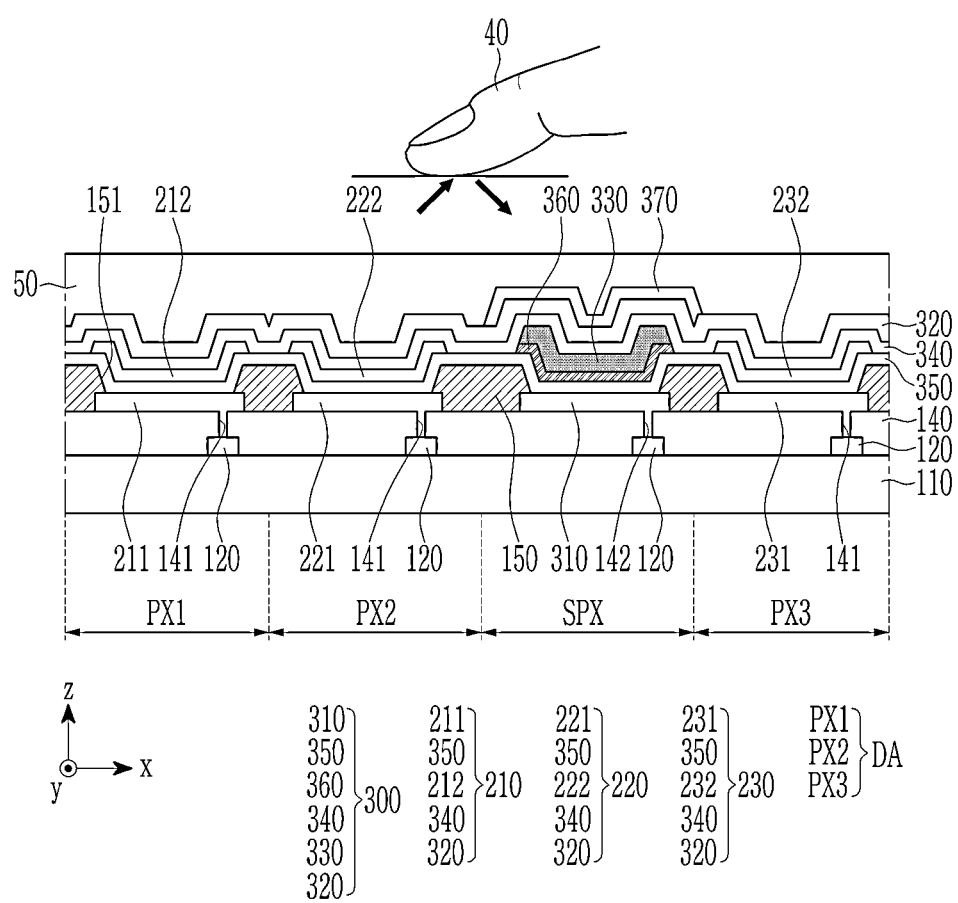
FIG. 3 shows a cross-sectional view of an example of a sensor embedded display panel according to some example embodiments.

FIG. 3 shows a cross-sectional view of another example of a sensor embedded display panel according to some example embodiments.

Referring to FIG. 3, in a like way of some example embodiments, including the example embodiments shown in FIGS. 1 and/or 2, the sensor embedded display panel 1000 according to some example embodiments includes a plurality of sub-pixels (PX) for displaying different colors, that is, a first sub-pixel (PX1), a second sub-pixel (PX2), and a third sub-pixel (PX3) for displaying a first color, a second color, and a third color that are different from each other and are selected from among the red, green, and blue, and the first sub-pixel (PX1), the second sub-pixel (PX2), and the third sub-pixel (PX3) respectively include a first light emitting element 210, a second light emitting element 220, and a third light emitting element 230.

The sensor embedded display panel 1000 may further include a color filter 370 for transmitting (e.g., selectively transmitting) light with a specific wavelength spectrum, differing from some example embodiments, including the example embodiments shown in FIGS. 1, 2, and/or 3. For example, the photoelectric element 300 further includes a color filter 370. The color filter 370 is positioned on the light absorbing layer 330. In detail, the color filter 370 may be positioned between the common electrode 320 and the encapsulation layer 50, and is not limited thereto.

The wavelength spectrum of light absorbed by the light absorbing layer 330 corresponds to the wavelength spectrum of light transmitted (e.g., selectively transmitted) by the color filter 370 positioned on the light absorbing layer 330. For example, when the light absorbing layer 330 selectively absorbs the light with the green wavelength spectrum having the maximum absorption wavelength of about 500 nm to 600 nm, the color filter 370 may have the maximum transmittance at about 500 nm to 600 nm. The color filter 370 may be configured to transmit (e.g., selectively transmit) light of a particular wavelength spectrum that corresponds to the auxiliary layer 360. Restated, where the auxiliary layer 360 may have a thickness (e.g., in the z direction as shown in FIG. 2, extending perpendicular to an in-plane direction of the substrate 110 and/or perpendicular to the upper surface of the substrate 110) that corresponds to a particular wavelength spectrum of light to be converted into an electrical signal by the photoelectric element 300, such that the particular wavelength spectrum may be understood to correspond to the auxiliary layer 360, the color filter 370 may be configured to selectively transmit light (e.g., incident light) of the particular wavelength spectrum.

A sensor embedded display panel 1000 according to some example embodiments will now be described.

Figure 4:
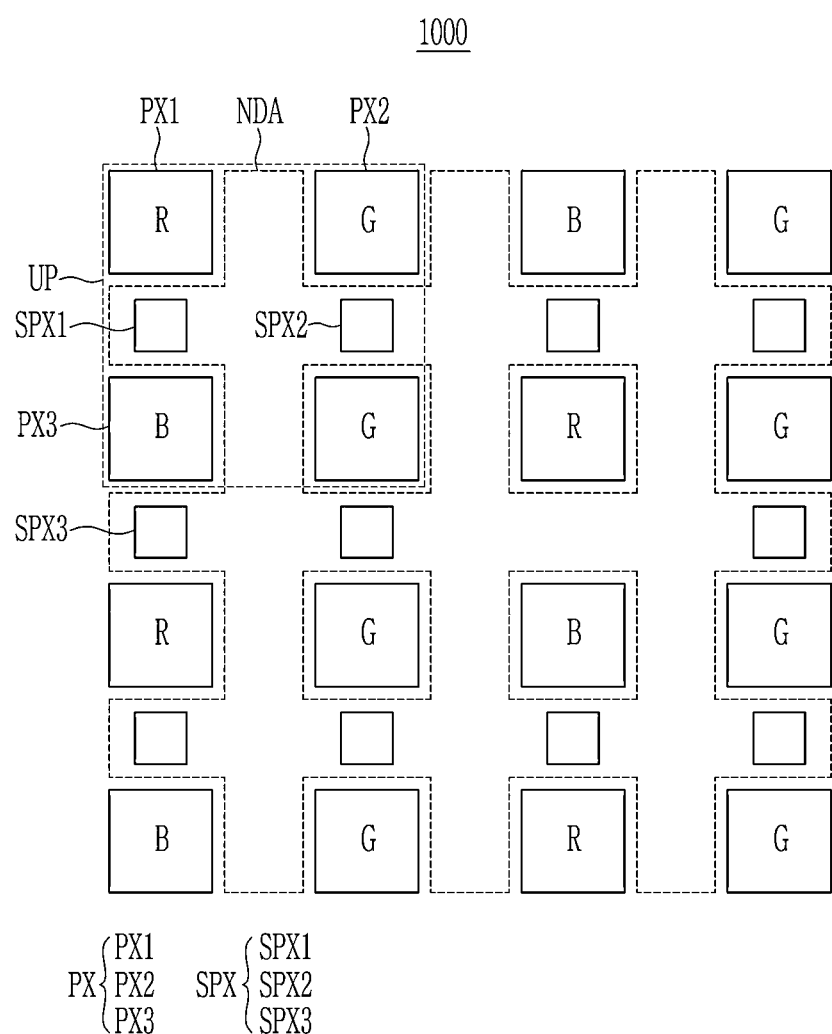
FIG. 4 shows a top plan view of a sensor embedded display panel according to some example embodiments.
Figure 5:
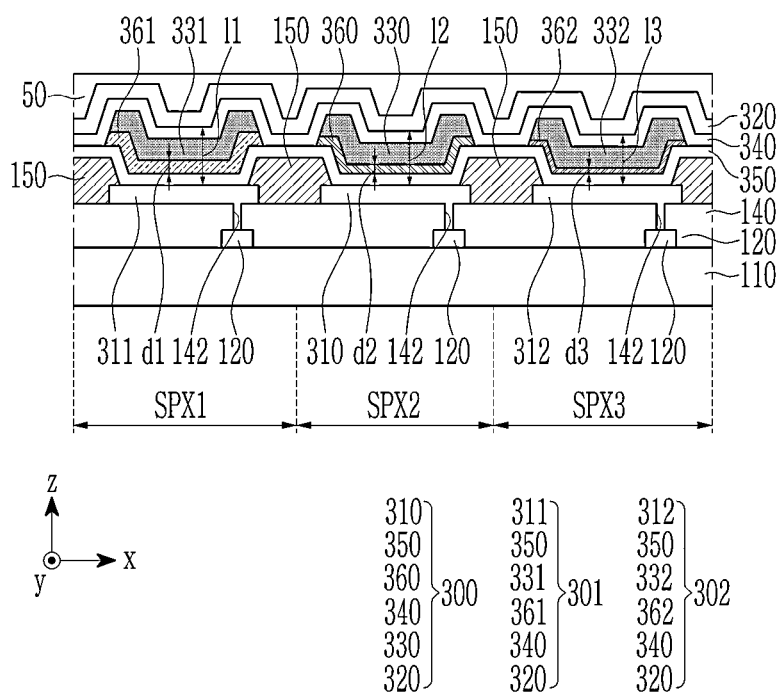
FIG. 5 shows a cross-sectional view of an example of a sensor embedded display panel according to some example embodiments.

FIG. 4 shows a top plan view of a sensor embedded display panel according to some example embodiments, and FIG. 5 shows a cross-sectional view of an example of a sensor embedded display panel according to some example embodiments.

Referring to FIG. 4 and FIG. 5, in a like way of some example embodiments, including the example embodiments shown in FIGS. 1, 2, and/or 3, the sensor embedded display panel 1000 according to some example embodiments includes a first sub-pixel (PX1), a second sub-pixel (PX2), and a third sub-pixel (PX3) for displaying a first color, a second color, and a third color that are different from each other and are selected from among the red, green, and blue. The first sub-pixel (PX1), the second sub-pixel (PX2), and the third sub-pixel (PX3) respectively include a first light emitting element 210, a second light emitting element 220, and a third light emitting element 230.

Differing from some example embodiments, including the example embodiments shown in FIGS. 1, 2, and/or 3, regarding the sensor embedded display panel 1000 according to some example embodiments, the sensor pixels (SPX) include a first sensor pixel (SPX1), a second sensor pixel (SPX2), and a third sensor pixel (SPX3) for converting light of the first color, the second color, and the third color that are different from each other into electrical signals.

The first sensor pixel (SPX1) for converting light with the wavelength spectrum of the first color into an electrical signal may be positioned near the first sub-pixel (PX1) for emitting light with the wavelength spectrum of the first color. In a like manner, the second sensor pixel (SPX2) for converting light with the wavelength spectrum of the second color into an electrical signal may be positioned near the second sub-pixel (PX2) for emitting light with the wavelength spectrum of the second color, and the third sensor pixel (SPX3) for converting light with the wavelength spectrum of the third color into an electrical signal may be positioned near the third sub-pixel (PX3) for emitting light with the wavelength spectrum of the third color. Here, "being position near" signifies that a distance between the first sub-pixel (PX1) and the first sensor pixel (SPX1) is equal to or less than a distance between the second sub-pixel (PX2) and the first sensor pixel (SPX1) or a distance between the third sub-pixel (PX3) and the first sensor pixel (SPX1).

Referring to FIG. 5, in a like way of some example embodiments, including the example embodiments described with reference to FIG. 1, the sensor embedded display panel 1000 according to some example embodiments includes a substrate 110, a thin film transistor 120 formed on the substrate 110, an insulation layer 140 formed on the thin film transistor 120, a pixel definition layer 150 formed on the insulation layer 140, and first, second, and third light emitting elements 210, 220, and 230 positioned in spaces partitioned by the pixel definition layer 150.

However, the sensor embedded display panel 1000 additionally includes first, second, and third photoelectric elements 300, 301, and 302 positioned in the spaces partitioned by the pixel definition layer 150 in some example embodiments, including the example embodiments shown in FIGS. 1, 2, and/or 3.

The first sensor pixel (SPX1) includes a second photoelectric element 301, the second sensor pixel (SPX2) includes a first photoelectric element 300, and the third sensor pixel (SPX3) includes a third photoelectric element 302.

As described above, the first sensor pixel (SPX1) may convert the light with the red wavelength spectrum having the maximum absorption wavelength at greater than about 600 nm and less than 750 nm into an electrical signal, the second sensor pixel (SPX2) may convert the light with the green wavelength spectrum having the maximum absorption wavelength at about 500 nm to 600 nm into an electrical signal, and the third sensor pixel (SPX3) may convert the light with the blue wavelength spectrum having the maximum absorption wavelength at equal to or greater than about 380 nm and less than 500 nm into an electrical signal.

Referring to FIG. 5, in some example embodiments, the first, second, and third photoelectric elements 300, 301, and 302 may be understood to collectively comprise a photoelectric element, of the sensor embedded display panel 1000, that includes the first, second, and third sensor pixels SPX1, SPX2, and SPX3, where the first sensor pixel SPX1 is configured to convert incident light of the red wavelength spectrum into a first electrical signal, the second sensor pixel SPX2 is configured to convert incident light of the green wavelength spectrum into a second electrical signal, and the third sensor pixel SPX3 is configured to convert incident light of the blue wavelength spectrum into a third electrical signal.

The first, second, and third photoelectric elements 300, 301, and 302 respectively include, in a like manner of the photoelectric element 300 described with reference to FIG. 2, light absorbing layers 330, 331, and 332 positioned between the pixel electrodes 310, 311, and 312 and the common electrode 320.

The light absorbing layers 330, 331, and 332 may absorb light of the combination of the red wavelength spectrum, the green wavelength spectrum, and the blue wavelength spectrum. The light absorbing layers 330, 331, and 332 may be common layers including the same material. The respective thicknesses of the light absorbing layers 330, 331, and 332 may be substantially equivalent to each other.

The sensor pixel (SPX) may include two types of sensor pixels for converting light with two different colors into electrical signals. In this case, the light absorbing layer 330 may absorb the light of the combination of the wavelength spectrums of two colors (e.g., two of the red, green, or blue).

The sensor pixels (SPX) may include four types of sensor pixels for converting light with four types of different wavelengths into electrical signals. In this case, the light absorbing layer 330 may absorb light of the combination of the red wavelength spectrum, the green wavelength spectrum, the blue wavelength spectrum, and the infrared ray wavelength spectrum.

The first, second, and third photoelectric elements 300, 301, and 302 include, in a like way of the photoelectric element 300 described with reference to FIG. 2, first, second, and third auxiliary layers 360, 361, and 362 positioned between the light absorbing layers 330, 331, and 332 and the second common auxiliary layer 350. The first, second, and third auxiliary layers 360, 361, and 362 may have thicknesses corresponding to the wavelength spectrum of the light to be converted into electrical signals by the first, second, and third photoelectric elements 300, 301, and 302.

For example, the optical length between the common electrode and the pixel electrode is different depending on the thicknesses of the respective auxiliary layers 360, 361, and 362, and the light with the green, red, blue, or infrared ray wavelength spectrum may resonate. The first, second, and third photoelectric elements 300, 301, and 302 may convert the light with the color spectrum according to the thickness of the corresponding auxiliary layer into the electrical signals.

The respective thicknesses of the first, second, and third auxiliary layers 360, 361, and 362 may be different from each other. For example, when the first, second, and third photoelectric elements 300, 301, and 302 convert the light with the green, red, blue wavelength spectrums into electrical signals, the thickness of the auxiliary layer 360 may be less than the thickness of the second auxiliary layer 361. The thickness of the third auxiliary layer 362 is less than the thickness of the auxiliary layer 360.

At least one of the first, second, or third photoelectric elements 300, 301, or 302 may not have a corresponding auxiliary layer. For example, as the optical length (e.g., the distance between the semi-transmission electrode and the reflecting electrode positioned at the top/bottom of the third photoelectric element 302) corresponding to the blue light spectrum must be formed to be shorter than the first and second photoelectric elements 300 and 301, the third photoelectric element 302 may not have a corresponding third auxiliary layer. That is, the thickness of the third auxiliary layer 362 may be 0.

The thicknesses of the first, second, and third auxiliary layers 360, 361, and 362 may be different from each other according to the materials configuring the light absorbing layers 330, 331, and 332 and/or the thicknesses of the light absorbing layers 330, 331, and 332. Restated, respective thicknesses of respective auxiliary layers of the first sensor pixel SPX1 (e.g., the first auxiliary layer 360), the second sensor pixel SPX2 (e.g., the second auxiliary layer 361), and the third sensor pixels SPX3 (e.g., the third auxiliary layer 362) may be different from each other. For example, in the two cases in which the materials configuring the p-type semiconductors of the light absorbing layers 330, 331, and 332 are different from each other, the thicknesses of the first auxiliary layer 360 in the two cases may be different from each other.

Absorbance rates for the two cases in which the thicknesses of the first, second, and third auxiliary layers 360, 361, and 362 are different will now be described with reference to FIGS. 6A and 6B.

Figure 6A:
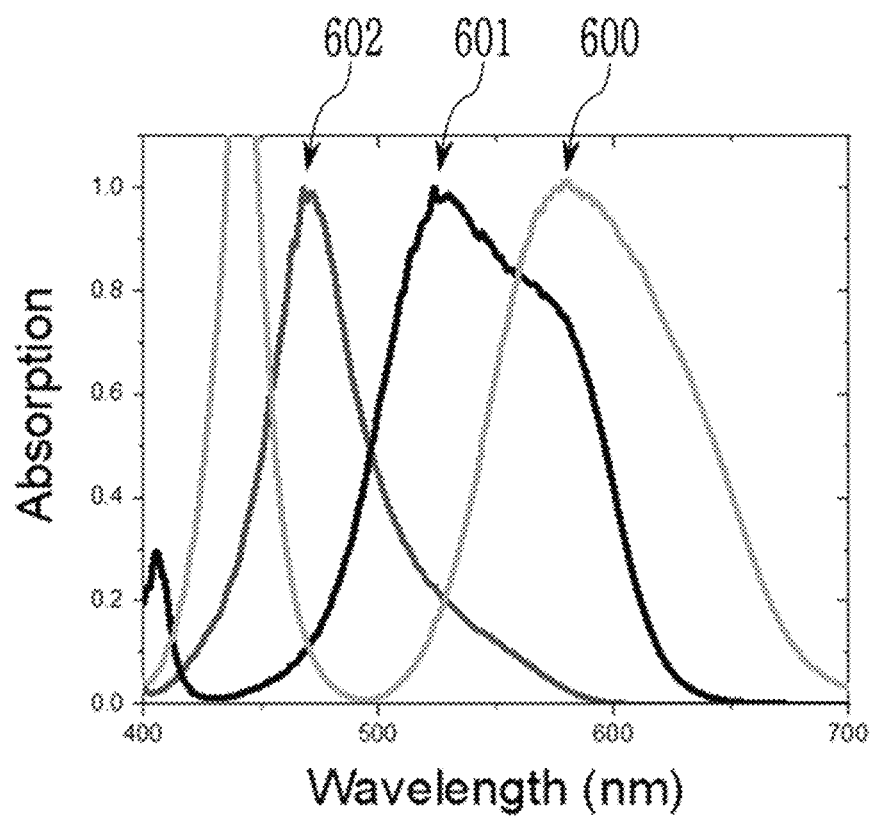
FIG. 6A and FIG. 6B show graphs of absorbance rates with respect to wavelengths of an image sensor of FIG. 5 according to some example embodiments.
Figure 6B:
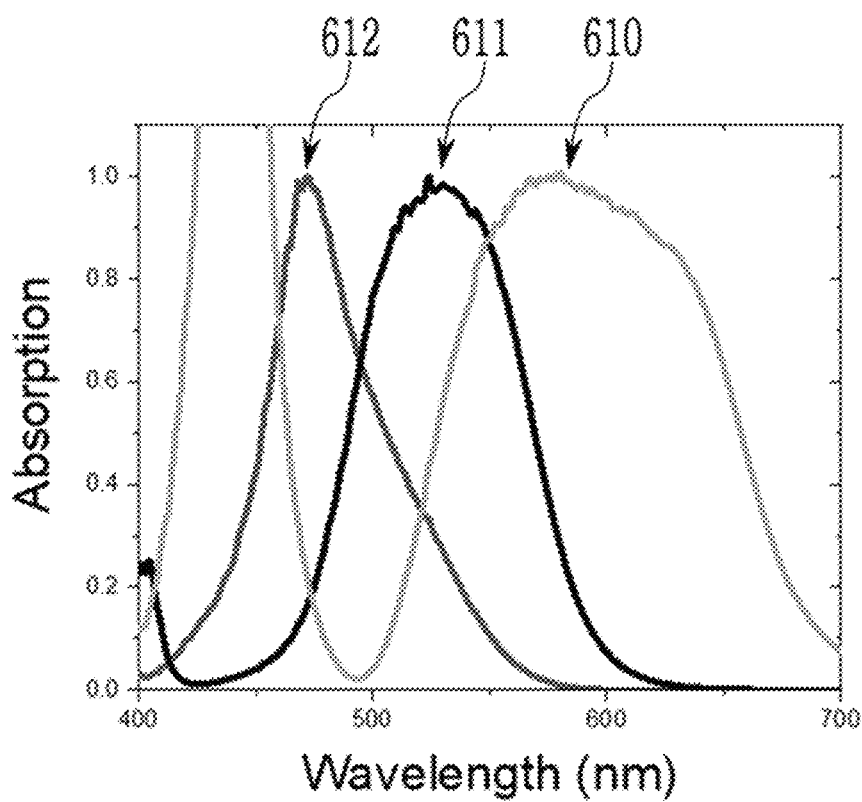

FIGS. 6A and 6B show graphs of absorbance rates with respect to wavelengths of an image sensor of FIG. 5 according to some example embodiments.

As shown in FIGS. 6A and 6B, the first photoelectric element 300 indicates maximum absorption rates 601 and 611 in the green wavelength spectrum, the second photoelectric element 301 indicates maximum absorption rates 600 and 610 in the red wavelength spectrum, and the third photoelectric element 302 indicates maximum absorption rates 602 and 612 in the blue wavelength spectrum.

The material for configuring the light absorbing layers 330, 331, and 332 of FIG. 6A is different from the material for configuring the light absorbing layers 330, 331, and 332 of FIG. 6B. Therefore, the maximum absorption rates for the respective wavelengths are different in FIGS. 6A and 6B.

Another example of a sensor embedded display panel 1000 according to some example embodiments will now be described.

Figure 7:
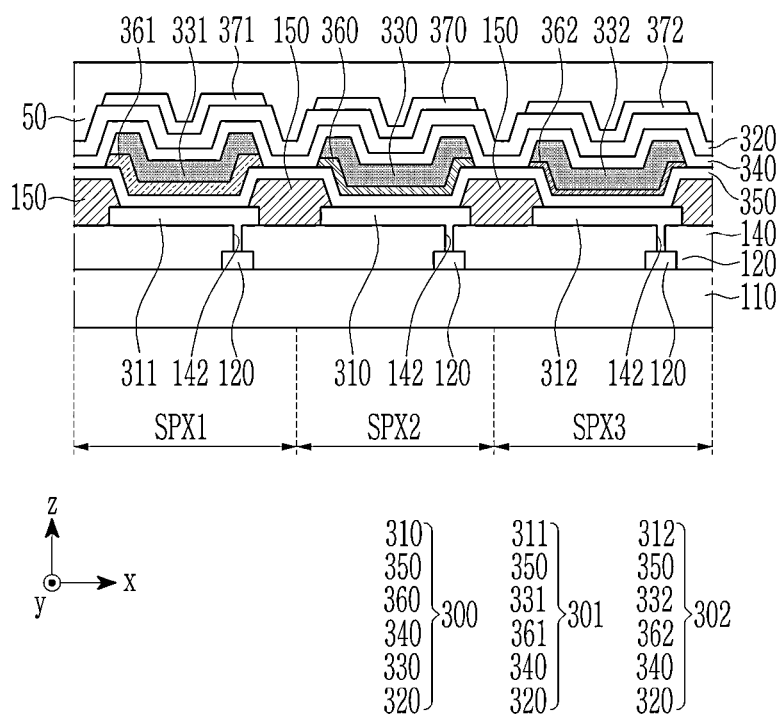
FIG. 7 shows a cross-sectional view of a sensor embedded display panel according to some example embodiments.

FIG. 7 shows a cross-sectional view of a sensor embedded display panel according to some example embodiments.

Referring to FIG. 7, in a like manner of some example embodiments, including the example embodiments described with reference to FIG. 5, the sensor embedded display panel 1000 according to some example embodiments includes a plurality of sub-pixels (PX) for displaying different colors, that is, the first sub-pixel (PX1), the second sub-pixel (PX2), and the third sub-pixel (PX3) for displaying a first color, a second color, and a third color that are different from each other and are selected from among the red, green, and blue, and a plurality of sensor pixels (SPX), that is, the first sensor pixel (SPX1), the second sensor pixel (SPX2), and the third sensor pixel (SPX3) for absorbing light of a first color, a second color, and a third color that are different from each other and are selected from among the red, green, and blue and converting the same into electrical signals, the first sub-pixel (PX1), the second sub-pixel (PX2), and the third sub-pixel (PX3) respectively include a first light emitting element 210, a second light emitting element 220, and a third light emitting element 230, and the first sensor pixel (SPX1), the second sensor pixel (SPX2), and the third sensor pixel (SPX3) for performing conversion respectively include a second photoelectric element 301, a first photoelectric element 300, and a third photoelectric element 302.

However, differing from some example embodiments, including the example embodiments shown in FIG. 5, the sensor embedded display panel 1000 according to some example embodiments may further include a color filter 370 for transmitting light with a specific wavelength spectrum. For example, the photoelectric element 300 further includes first, second, and third color filters 370, 371, and 372. The first, second, and third color filters 370, 371, and 372 are positioned on the light absorbing layers 330. In detail, the first, second, and third color filters 370, 371, and 372 may be positioned between the common electrode 420 and the encapsulation layer 50, and are not limited thereto.

The wavelength spectrums of the light absorbed by the light absorbing layers 330, 331, and 332 are equivalent to the wavelength spectrum of the light transmitted by the first, second, and third color filters 370, 371, and 372 positioned on the light absorbing layers 330, 331, and 332. For example, when the light absorbing layer 330 selectively absorbs the light with the green wavelength spectrum having the maximum absorption wavelength at about 500 nm to 600 nm, the first color filter 370 may have maximum transmittance at about 500 nm to 600 nm. When the light absorbing layer 331 selectively absorbs the light with the red wavelength spectrum having the maximum absorption wavelength at equal to or greater than about 600 nm and less than 750 nm, the second color filter 371 may have maximum transmittance at greater than about 600 nm and less than 750 nm. When the light absorbing layer 332 selectively absorbs the light with the blue wavelength spectrum having the maximum absorption wavelength at equal to or greater than about 380 nm and less than 500 nm, the third color filter 372 may have maximum transmittance at equal to or greater than about 380 nm and less than 500 nm.

Figure 8B:
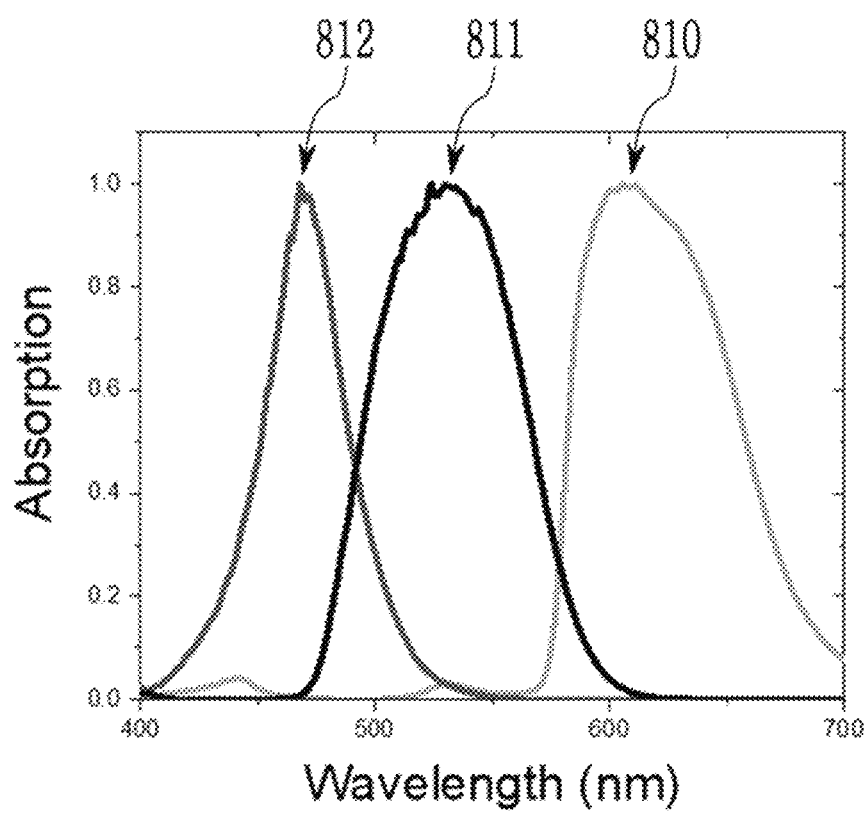

FIGS. 8A and 8B show graphs of absorbance rates with respect to wavelengths of an image sensor of FIG. 7 according to some example embodiments.

As shown in FIGS. 8A and 8B, by the first, second, and third color filters 370, 371, and 372, the first photoelectric element 300 expresses the maximum absorption rates 801 and 811 at the green wavelength spectrum, the second photoelectric element 301 expresses the maximum absorption rates 800 and 810 at the red wavelength spectrum, and the third photoelectric element 302 expresses the maximum absorption rates 802 and 812 at the blue wavelength spectrum.

The material configuring the light absorbing layers 330, 331, and 332 of FIG. 8A is different from the material configuring the light absorbing layers 330, 331, and 332 of FIG. 8B. Therefore, the maximum absorption rates for respective wavelengths are different in FIGS. 8A and 8B.

The sensor embedded display panel 1000 may be applied to various electronic devices such as a display device. The electronic devices such as a display device may, for example, include a mobile phone, a video phone, a smart phone, a smart pad, a smart watch, a digital camera, a tablet PC, a laptop PC, a notebook computer, a computer monitor, a wearable computer, a television, a digital broadcasting terminal, an electronic book, a personal digital assistant (PDA), a portable multimedia player (PMP), an enterprise digital assistant (EDA), a head mounted display (HMD), a vehicle GPS, an Internet of things (IoT), an Internet of everything (IoE), a drone, a door lock, a safe, an automatic teller machine (ATM), a security device, a medical device, and an automotive application component, but are not limited thereto.

Figure 9:
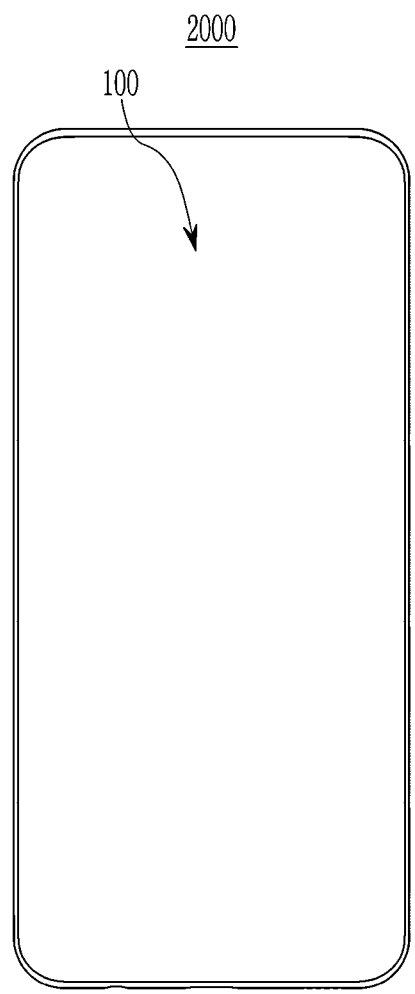
FIG. 9 shows a schematic diagram of an example of a smartphone as an electronic device according to some example embodiments.

FIG. 9 shows a schematic diagram of an example of a smartphone as an electronic device according to some example embodiments.

Referring to FIG. 9, the electronic device 2000 includes the above-noted sensor embedded display panel 1000, and the photoelectric element 300 is disposed on the entire or partial portion of the sensor embedded display panel 1000, so the biometric function may be performed on any portion of the screen, and the biometric function may be selectively performed on a specific position requiring the biometric function according to a selection by the user.

An example of a method for the electronic device 2000 such as a display device to recognize the recognition target 40 may, for example, include: driving the first, second, and third light emitting elements 210, 220, and 230, (or first, second, third, and fourth light emitting elements) and the first, second, and third photoelectric elements 300, 301, and 302 of the sensor embedded display panel 1000 and allowing the first, second, and third photoelectric elements 300, 301, and 302 to detect the light reflected from the recognition target 40 from among the light emitted by the first, second, and third light emitting elements 210, 220, and 230 (or the first, second, third, and fourth light emitting elements); comparing a stored image of the recognition target 40 and an image of the recognition target 40 detected by the first, second, and third photoelectric elements 300, 301, and 302; and determining whether the compared images match each other, and when they are found to match each other, driving the sensor embedded display panel 1000 to turn off the first, second, and third photoelectric elements 300, 301, and 302 according to a determination that a recognition by the recognition target 40 is completed, allow the user to access the display device, and display an image.

Figure 10:
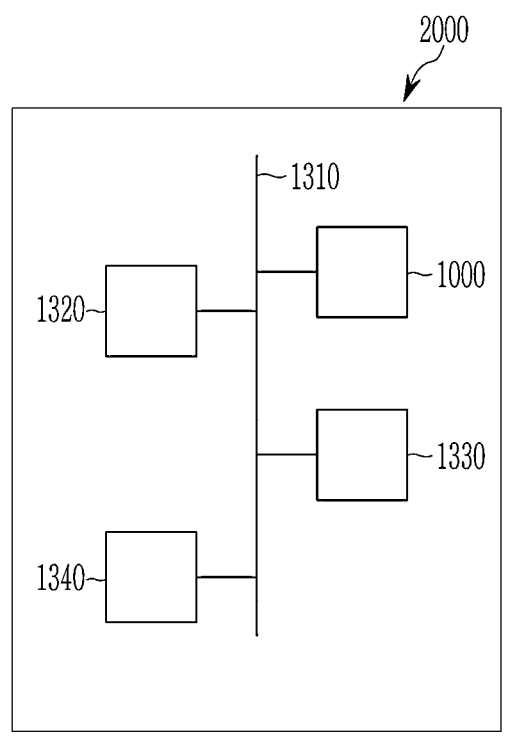
FIG. 10 shows a schematic diagram of an example of a configurational diagram of an electronic device according to some example embodiments.

FIG. 10 shows a schematic diagram of an example of a configurational diagram of an electronic device according to some example embodiments.

Referring to FIG. 10, the electronic device 2000 may further include a bus 1310, a processor 1320, a memory 1330, and at least one additional device 1340 in addition to the above-described constituent elements. Information of the sensor embedded display panel 1000, the processor 1320, the memory 1330, and the at least one additional device 1340 may be transmitted to each other through the bus 1310.

The processor 1320 may include hardwire including a logic circuit, hardware/software combination such as processor executing software, and at least one processing circuitry such as a combination of the hardwire and the hardware/software combination. For example, the processing circuitry may be a central processing unit (CPU), an arithmetic logic unit (ALU), a digital signal processor, a microcomputer, a field programmable gate array (FPGA), a system-on-chip (SoC), a programmable logic unit, a microprocessor, and an application-specific integrated circuit (ASIC). The processing circuitry may include a non-transitory computer readable storage device. The processor 1320 may, for example, control a display operation of the sensor embedded display panel 1000 or may control a sensor operation of the photoelectric element 300.

The memory 1330 may store instruction programs, and the processor 1320 may execute the stored instruction programs to execute the function relating to the sensor embedded display panel 1000.

The at least one additional device 1340 may be at least one communication interface (e.g., a radio communication interface, a cable interface), a user interface (e.g., a keyboard, a mouse, a button, etc.), a power supply and/or a power supply interface, or any combination thereof.

The units and/or the modules described in the present specification may be realized by using hardware constituent elements and software constituent elements. For example, the hardware constituent elements may include a microphone, an amplifier, a band-pass filter, an audio-digital converter, and a processing device. The processing device may be realized by executing program codes by performing arithmetic, logic, and input/output operations or may be realized by using at least one hardware device configured to execute the program codes. The processing device may include a processor, a controller, an arithmetic logic unit, a digital signal processor, a microcomputer, a field programmable array, a programmable logic unit, a microprocessor, or another device for responding to instructions and executing the instructions. The processing device may access, store, operate, process, and generate data in response to an execution of an operating system (OS) and at least one piece of software executed by the operating system.

The software may include computer programs, codes, instructions, and combinations thereof, and the processing device may be converted to fit to a specific purpose by independently or collectively instructing and/or configuring the processing device so that it may be operable as desired. The software and the data may be permanently or temporarily realized as signal waves for providing instructions or data to a machine, a component, physical or virtual equipment, a computer storage medium or device, or a processing device, or analyzing the same. The software may be distributed through a computer system connected to a network, and may be stored and executed by a distribution method. The software and the data may be stored by at least one non-transitory computer readable storage device.

The method described according to some example embodiments may be recorded in a non-transitory computer readable storage device including a program instruction for realizing various operations according to some example embodiments. The storage device may include program instructions, data files, data structures, and combinations thereof. The program instructions recorded in the storage device may be specially designed for some example embodiments or may be known to a person of ordinary skill in the art of computer software and may be used. Examples of the non-transitory computer readable storage device may include magnetic media such as a hard disk drive, a floppy disk, or a magnetic tape, optical media such as a CD-ROM disk, a DVD and/or Blu-ray disc, a magneto optical disc such as an optical disk, and a hardwired device for storing and executing program instructions such as a ROM, a RAM, and a flash memory. The above-described device may be configured to be operable as at least one software module for performing the operation of the above-described example.

While the inventive concepts have been described in connection with what is presently considered to be practical example embodiments, it is to be understood that the inventive concepts are not limited to such example embodiments, but, on the contrary, are intended to cover various modifications and equivalent arrangements included within the spirit and scope of the appended claims.

<Description of symbols>

| | |
|---|---|
| 40: recognition target | 50: encapsulation layer |
| 110: substrate | 120: thin film transistor |
| 140: insulation layer | 141, 142: contact hole |
| 150: pixel definition layer | |
| 210, 220, 230: light emitting element | |
| 300, 301, 302: photoelectric element | |
| 211, 221, 231, 310, 311, 312: pixel electrode | |
| 212, 222, 232: emission layer | 320: common electrode |
| 330: light absorbing layer | 340: first common auxiliary layer |
| 350: second common auxiliary layer | |
| 360, 361, 362: auxiliary layer | |
| 1000: sensor embedded display panel | |
| 2000: electronic device | |

What is claimed is:

1. A sensor embedded display panel, comprising:
a substrate;
a light emitting element on the substrate, the light emitting element including an emission layer; and
a photoelectric element on the substrate, the photoelectric element including a light absorbing layer, the light absorbing layer at least partially overlapping the emission layer in a horizontal direction extending in parallel to an upper surface of the substrate,
wherein each of the light emitting element and the photoelectric element include
a separate portion of a first common auxiliary layer that extends on both a top of the emission layer and a top of the light absorbing layer, and
a separate portion of a second common auxiliary layer that extends on both a bottom of the emission layer and a bottom of the light absorbing layer,
wherein the photoelectric element includes a first sensor pixel configured to convert incident light of a red wavelength spectrum into a first electrical signal, a second sensor pixel configured to convert incident light of a green wavelength spectrum into a second electrical signal, and a third sensor pixel configured to convert incident light of a blue wavelength spectrum into a third electrical signal, and
wherein the first sensor pixel includes a first auxiliary layer that has a first thickness, the second sensor pixel includes a second auxiliary layer that has a second thickness, and the third sensor pixel includes a third auxiliary layer that has a third thickness, the second thickness smaller than the first thickness, the third thickness smaller than the second thickness.

2. The sensor embedded display panel of claim 1, wherein the light absorbing layer is configured to absorb incident light of a combination of the red wavelength spectrum, the green wavelength spectrum, and the blue wavelength spectrum.

3. The sensor embedded display panel of claim 1, wherein each of the first auxiliary layer, the second auxiliary layer, and the third auxiliary layer is between the first common auxiliary layer and the light absorbing layer.

4. The sensor embedded display panel of claim 1, wherein each of the first auxiliary layer, the second auxiliary layer, and the third auxiliary layer is between the second common auxiliary layer and the light absorbing layer.

5. The sensor embedded display panel of claim 1, wherein the first sensor pixel includes a first color filter configured to selectively transmit incident light of the red wavelength spectrum, the second sensor pixel includes a second color filter configured to selectively transmit incident light of the green wavelength spectrum, and the third sensor pixel includes a third color filter configured to selectively transmit incident light of the blue wavelength spectrum.

6. The sensor embedded display panel of claim 1, wherein the light emitting element and the photoelectric element each further include
a separate portion of a common electrode that is configured to apply a common voltage to the light emitting element and the photoelectric element, and
a pixel electrode facing the common electrode, and
the first common auxiliary layer is below the common electrode, and
the second common auxiliary layer is on the pixel electrode.

7. The sensor embedded display panel of claim 1, wherein the sensor embedded display panel includes a display area configured to display an image and a non-display area that is a portion of a total area of the sensor embedded display panel that excludes the display area, and
the photoelectric element is located in the non-display area.

8. The sensor embedded display panel of claim 7, further comprising:
a plurality of first sub-pixels configured to display a red color and including a first light emitting element;
a plurality of second sub-pixels configured to display a green color and including a second light emitting element; and
a plurality of third sub-pixels configured to display a blue color and including a third light emitting element,
wherein the first sub-pixels, the second sub-pixels, and the third sub-pixels are located in the display area.

9. The sensor embedded display panel of claim 8, wherein the photoelectric element is between at least two of
a first sub-pixel of the plurality of first sub-pixels,
a second sub-pixel of the plurality of second sub-pixels, or
a third sub-pixel of the plurality of third sub-pixels.

10. The sensor embedded display panel of claim 8, further comprising:
a plurality of fourth sub-pixels including a fourth light emitting element configured to emit light of an infrared wavelength spectrum,
wherein the photoelectric element is configured to further absorb incident light of the infrared wavelength spectrum.

11. The sensor embedded display panel of claim 1, wherein
the light absorbing layer includes an organic material.

12. The sensor embedded display panel of claim 1, wherein
the emission layer includes an organic light emitting material, a quantum dot, a perovskite, and any combination thereof.

13. A display device including the sensor embedded display panel according to claim 1.

14. The sensor embedded display panel of claim 1, wherein the emission layer is directly between the first common auxiliary layer and the second common auxiliary layer, such that the first common auxiliary layer is directly above the emission layer and the second common auxiliary layer is directly beneath the emission layer.

15. An image sensor, comprising:
a substrate; and
a photoelectric element on the substrate, the photoelectric element including a light absorbing layer that is configured to absorb light of a combination of a red wavelength spectrum, a green wavelength spectrum, and a blue wavelength spectrum,
wherein the photoelectric element includes
a first common auxiliary layer at a top of the light absorbing layer, and
a second common auxiliary layer at a bottom of the light absorbing layer,
wherein the photoelectric element further includes a first sensor pixel configured to convert incident light of the red wavelength spectrum into a first electrical signal, a second sensor pixel configured to convert incident light of the green wavelength spectrum into a second electrical signal, and a third sensor pixel configured to convert incident light of the blue wavelength spectrum into a third electrical signal, and wherein the first sensor pixel includes a first auxiliary layer that has a first thickness, the second sensor pixel includes a second auxiliary layer that has a second thickness, and the third sensor pixel includes a third auxiliary layer that has a third thickness, the second thickness smaller than the first thickness, the third thickness smaller than the second thickness.

16. The image sensor of claim 15, wherein each of the first auxiliary layer, the second auxiliary layer, and the third auxiliary layer is between the first common auxiliary layer and the light absorbing layer.

17. The image sensor of claim 15, wherein each of the first auxiliary layer, the second auxiliary layer, and the third auxiliary layer is between the second common auxiliary layer and the light absorbing layer.

18. The image sensor of claim 15, wherein the first sensor pixel includes a first color filter configured to selectively transmit incident light of the red wavelength spectrum, the second sensor pixel includes a second color filter configured to selectively transmit incident light of the green wavelength spectrum, and the third sensor pixel includes a third color filter configured to selectively transmit incident light of the blue wavelength spectrum.

\* \* \* \* \*